(12) United States Patent
Seidel et al.

(10) Patent No.: US 7,037,457 B2
(45) Date of Patent: *May 2, 2006

(54) SYSTEMS AND METHODS FOR COMPOSITE WEBS WITH STRUCTURED DISCRETE POLYMERIC REGIONS

(75) Inventors: David L. Seidel, Woodbury, MN (US); Scott J. Tuman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/012,894

(22) Filed: Nov. 5, 2001

(65) Prior Publication Data

US 2003/0085485 A1    May 8, 2003

(51) Int. Cl.
*D01D 5/20* (2006.01)
(52) U.S. Cl. .................................. 264/267; 264/220
(58) Field of Classification Search ................ 264/167, 264/220
See application file for complete search history.

(56) References Cited

U.S. PATENT DOCUMENTS

| | | |
|---|---|---|
| 2,170,560 A | 8/1939 | Hayes |
| 2,787,244 A | 4/1957 | Hicken |
| 3,276,944 A | 10/1966 | Levy |
| 3,338,992 A | 8/1967 | Kinney |
| 3,341,394 A | 9/1967 | Kinney |
| 3,502,538 A | 3/1970 | Peterson |
| 3,502,763 A | 3/1970 | Hartman |
| 3,542,615 A | 11/1970 | Dobo et al. |
| 3,692,618 A | 9/1972 | Dorschner et al. |
| 3,694,867 A | 10/1972 | Stumpf |
| 3,814,052 A | 6/1974 | Caratsch |
| 4,223,059 A | 9/1980 | Schwarz |
| 4,340,563 A | 7/1982 | Appel et al. |
| 4,343,260 A | 8/1982 | Yajima et al. |
| 4,643,130 A | 2/1987 | Sheath et al. |
| 4,732,800 A | 3/1988 | Groshens |
| 4,906,492 A | 3/1990 | Groshens |
| 4,965,122 A | 10/1990 | Morman |
| 4,981,747 A | 1/1991 | Morman |
| 4,984,339 A | 1/1991 | Provost et al. |
| 5,019,071 A | 5/1991 | Bany et al. |
| 5,028,646 A | 7/1991 | Miller et al. |
| 5,077,870 A | 1/1992 | Melbye et al. |
| 5,114,781 A | 5/1992 | Morman |
| 5,116,563 A | 5/1992 | Thomas et al. |

(Continued)

FOREIGN PATENT DOCUMENTS

EP       0 189 351 A2     7/1986

(Continued)

OTHER PUBLICATIONS

Encyclopedia of Chemical Technology, vol. 6 (1979), Wiley-Interscience Publication, Third Edition, pp. 388-389.*

*Primary Examiner*—Brenda A. Lamb
(74) *Attorney, Agent, or Firm*—Kevin W Raasch

(57) ABSTRACT

Systems and methods for manufacturing composite webs including a substrate with one or more discrete polymeric regions located thereon are disclosed. The discrete polymeric regions are deposited by transferring molten thermoplastic composition from depressions on a transfer roll to a substrate. Each of the discrete polymeric regions is further formed to include multiple structures formed thereon. Those structures may include, for example, stems (capped or otherwise), hooks (as part of a hook and loop fastening system), pyramids, etc.

40 Claims, 8 Drawing Sheets

U.S. PATENT DOCUMENTS

| | | |
|---|---|---|
| 5,116,662 A | 5/1992 | Morman |
| 5,167,897 A | 12/1992 | Weber |
| 5,226,992 A | 7/1993 | Morman |
| 5,230,851 A | 7/1993 | Thomas |
| 5,260,015 A | 11/1993 | Kennedy et al. |
| 5,300,057 A | 4/1994 | Miller et al. |
| 5,326,415 A | 7/1994 | Thomas et al. |
| 5,385,706 A | 1/1995 | Thomas |
| 5,389,438 A | 2/1995 | Miller et al. |
| 5,399,219 A | 3/1995 | Roessler et al. |
| 5,441,687 A | 8/1995 | Murasaki et al. |
| 5,454,801 A | 10/1995 | Lauritzen |
| 5,458,590 A | 10/1995 | Schleinz et al. |
| 5,470,424 A | 11/1995 | Isaac et al. |
| 5,490,457 A | 2/1996 | Boulanger et al. |
| 5,501,679 A | 3/1996 | Krueger et al. |
| 5,503,076 A | 4/1996 | Yeo |
| 5,578,344 A | 11/1996 | Ahr et al. |
| 5,679,302 A | 10/1997 | Miller et al. |
| 5,685,758 A | 11/1997 | Paul et al. |
| 5,685,873 A | 11/1997 | Bruemmer |
| 5,705,013 A | 1/1998 | Nease et al. |
| 5,755,015 A | 5/1998 | Akeno et al. |
| 5,792,411 A | 8/1998 | Morris et al. |
| 5,843,057 A | 12/1998 | McCormack |
| 5,868,987 A | 2/1999 | Kampfer et al. |
| 5,916,207 A | 6/1999 | Toyoda |
| 5,948,707 A | 9/1999 | Crawley |
| 6,039,911 A | 3/2000 | Miller et al. |
| 6,054,091 A | 4/2000 | Miller et al. |
| 6,093,665 A | 7/2000 | Sayovitz et al. |
| 6,132,411 A | 10/2000 | Huber et al. |
| 6,132,660 A | 10/2000 | Kampfer |
| 6,190,594 B1 | 2/2001 | Gorman et al. |
| 6,255,236 B1 | 7/2001 | Cree et al. |
| 6,261,278 B1 | 7/2001 | Chen et al. |
| 6,287,665 B1 | 9/2001 | Hammer |
| 6,638,605 B1 | 10/2003 | Ankuda, Jr. et al. |
| 2002/0115972 A1 | 8/2002 | Dabi et al. |
| 2003/0085485 A1 | 5/2003 | Seidel et al. |
| 2003/0087059 A1 | 5/2003 | Jackson et al. |
| 2003/0088220 A1 | 5/2003 | Molander et al. |
| 2003/0088228 A1 | 5/2003 | Desai et al. |
| 2003/0091807 A1 | 5/2003 | Desai et al. |
| 2003/0111166 A1 | 6/2003 | Uitenbroek et al. |

FOREIGN PATENT DOCUMENTS

| | | |
|---|---|---|
| EP | 0 189 351 B1 | 3/1991 |
| FR | 1117251 | 5/1956 |
| FR | 2184741 | 12/1973 |
| TW | 355678 | 1/1998 |
| WO | WO 96/10481 A1 | 4/1996 |
| WO | WO 00/07532 A1 | 2/2000 |
| WO | WO 00/20200 A1 | 4/2000 |
| WO | WO 00/50229 A1 | 8/2000 |
| WO | WO 01/68019 A1 | 9/2001 |
| WO | WO 01/71080 A1 | 9/2001 |

* cited by examiner

SYSTEMS AND METHODS FOR COMPOSITE WEBS WITH STRUCTURED DISCRETE POLYMERIC REGIONS

FIELD OF THE INVENTION

The present invention relates to systems and methods for manufacturing composite webs that include structured discrete polymeric regions on at least one surface thereof.

BACKGROUND

The manufacture of articles that include thermoplastic structures useful to, e.g., fasten articles together (hook and loop systems, capped stems, etc.) are known. Such processes, however, typically provide thermoplastic structures that are located over an entire substrate or web. Where smaller, discrete regions of fastening or other structures are required, pieces of the preformed thermoplastic structures are often attached to a separate article, e.g., the fastening tab of a diaper or incontinence garment.

The handling and attachment of such discrete pieces can, however, be problematic, by potentially reducing throughput, causing waste (where the discrete pieces are not securely attached), etc. The discrete pieces may also present relatively sharp edges that may be the source of irritation or discomfort.

Some of these issues are addressed in U.S. patent application Ser. No. 09/257,447 by Tuman et al., filed on Feb. 25, 1999, titled WEB HAVING DISCRETE STEM REGIONS (also published as International Publication No. WO 00/50229). That document describes webs having discrete polymeric regions formed thereon by the use of extrusion coating (with or without the use of rotating blades). The extrusion coating may be performed using a series of nozzles that may be cycled to deliver discrete amounts of polymeric material to a web. Another alternative method discussed in the document is the use of screen printing.

All of the methods for forming discrete polymeric regions disclosed by WO 00/50229 include some disadvantages. For example, the use of extrusion dies and/or nozzles and any associated equipment (e.g., rotating blades, etc.) may result in limited shapes that can be formed on the webs. Another potential disadvantage is that the speed at which the patterns may be formed is somewhat limited, especially where larger or thicker discrete polymeric regions are required. Another disadvantage associated with extrusion-based systems is that the ability to form some shapes with any precision may be limited by the nature of the extrusion process.

As for the use of screen printing to form discrete polymeric regions, one disadvantage is that the amount of material that can be delivered through the orifices of a screen may not be sufficient to allow for forming of structures after deposition of the discrete polymeric regions, particularly when the thermoplastic compositions used for the discrete polymeric regions have a relatively high viscosity. More importantly, however, may be the limitations on screen orifice size. If the orifices are too large, the integrity of the screen can be impaired, particularly if higher pressures are required to force higher viscosity materials through the screen orifices.

Another disadvantage related to screen orifices is that orifices that extend continuously about the circumference of the screen printing roll cannot be provided without destroying the integrity of the roll. Further, orifices that extend too far in any direction can significantly limit the forces that can be applied to the screen printing roll without excessive distortion of the screen printing roll.

Another disadvantage of screen printing processes is that the ability to force the molten thermoplastic composition into the substrate (where, e.g., the substrate is porous, fibrous, etc.) may be limited because no physical structure is provided directly opposite from the substrate on which the discrete polymeric regions are deposited.

Screen integrity may also limit the amount of pressure that can be applied to clean the screen of the molten thermoplastic composition between printing passes. As the thermoplastic material builds up on the screen, it may be subject to charring or other degradation that could further hamper performance of the system as a whole.

SUMMARY OF THE INVENTION

The present invention provides systems and methods for manufacturing composite webs including a substrate with one or more discrete polymeric regions located thereon. Each of the discrete polymeric regions is further formed to include multiple structures formed thereon. Those structures may include, for example, stems (capped or otherwise), hooks (as part of a hook and loop fastening system), pyramids, etc.

One advantage of the systems and methods of the present invention is the ability to transfer one or more discrete polymeric regions onto a major surface of a substrate, where the thermoplastic material of the discrete polymeric region can be forced against the substrate by a transfer roll. If the substrate is porous, fibrous, etc., pressure may enhance attachment of the discrete polymeric regions to the substrates by forcing a portion of the thermoplastic composition to infiltrate the substrate and/or encapsulate fibers of the substrate.

Another advantage of the systems and methods of the present invention is the ability to produce a composite web including discrete structured polymeric regions formed thereon in a single pass, with the input of a substrate and molten thermoplastic composition.

Another advantage is the ability to control the shape, spacing, and volume of the discrete polymeric regions. This may be particularly advantageous because these parameters (shape, spacing, and volume) can be fixed regardless of the line speed of the system.

Another advantage of the systems and methods of the present invention is the ability to provide one or more discrete polymeric regions that extend for the length of the substrate (while not being formed over the width of the substrate, i.e., the discrete polymeric regions are not coextensive with the major surface of the substrate). The use a transfer roll to form such continuous discrete polymeric regions may advantageously provide substantial control over the shape and size of the polymeric regions.

Another advantage of the systems and methods of the present invention is the ability to provide different thermoplastic compositions across the width of the substrate, such that some discrete polymeric regions may be formed of one thermoplastic composition, while other discrete polymeric regions are formed of a different thermoplastic composition.

Still another advantage of the systems and methods of the present invention is that the types of features formed in different discrete polymeric regions on the substrate may vary both across the width of the composite web, as well as in the down-web direction.

Yet another advantage of the systems and methods of the present invention is the ability to provide one or more discrete polymeric regions on both major surfaces of a substrate. The discrete polymeric regions on the opposing major surfaces may be formed with the same or different features as desired.

In one aspect, the present invention provides a method for producing a composite web by providing a transfer roll including an exterior surface with one or more depressions formed therein and delivering a molten thermoplastic composition onto the exterior surface of the transfer roll. The molten thermoplastic composition is wiped from the exterior surface of the transfer roll, wherein a portion of the molten thermoplastic composition enters the one or more depressions, and further wherein the portion of the molten thermoplastic composition in the one or more depressions remains in the one or more depressions after wiping the molten thermoplastic composition from the exterior surface of the transfer roll. At least a portion of the molten thermoplastic composition in the one or more depressions is transferred to a first major surface of a substrate by contacting the first surface of the substrate to the exterior surface of the transfer roll and the molten thermoplastic composition in the one or more depressions, followed by separating the substrate from the transfer roll, wherein one or more discrete polymeric regions formed from the thermoplastic composition are located on the first major surface of the substrate after separating the substrate from the transfer roll. The one or more discrete polymeric regions on the substrate are placed in contact with a forming tool under pressure, wherein a portion of the thermoplastic composition in at least one discrete polymeric region of the one or more discrete polymeric regions contacting the forming tool enters a plurality of cavities in the forming tool. The method further includes separating the substrate and the one or more discrete polymeric regions from the forming tool, wherein the at least one discrete polymeric region includes a plurality of structures formed thereon after separating the one or more discrete polymeric regions from the forming tool, the plurality of structures corresponding to the plurality of cavities in the forming tool.

In another aspect, the present invention provides a method for producing a composite web by providing a transfer roll including an exterior surface with one or more depressions formed therein and delivering a molten thermoplastic composition onto the exterior surface of the transfer roll. The molten thermoplastic composition is wiped from the exterior surface of the transfer roll, wherein a portion of the molten thermoplastic composition enters the one or more depressions, and wherein the portion of the molten thermoplastic composition in the one or more depressions remains in the one or more depressions after wiping the molten thermoplastic composition from the exterior surface of the transfer roll, and substantially all of the one or more depressions are substantially filled with the molten thermoplastic composition after the wiping. The method further includes forcing a portion of a first major surface of a substrate into the one or more depressions, wherein the first major surface has a porous surface including fibers, and wherein a portion of the molten thermoplastic composition in the one or more depressions infiltrates the porous surface, and still further wherein the molten thermoplastic composition encapsulates at least a portion of at least some of the fibers. The substrate is separated from the transfer roll, wherein one or more discrete polymeric regions formed of the thermoplastic composition are located on the first major surface of the substrate after separating the substrate from the transfer roll. The one or more discrete polymeric regions on the substrate are placed in contact with a forming tool under pressure, wherein a portion of the thermoplastic composition in at least one discrete polymeric region of the one or more discrete polymeric regions contacting the forming tool enters a plurality of cavities in the forming tool. The substrate and the one or more discrete polymeric regions are separated from the forming tool, wherein the at least one discrete polymeric region includes a plurality of structures formed thereon after separating the one or more discrete polymeric regions from the forming tool, the plurality of structures corresponding to the plurality of cavities in the forming tool.

In another aspect, the present invention provides a system for manufacturing composite webs. The system includes a web path defining a downstream direction along which a substrate moves through the system. The system also includes a molten thermoplastic composition delivery apparatus and a transfer roll. The transfer roll is located along the web path and includes an exterior surface and one or more depressions formed in the exterior surface of the transfer roll, wherein a portion of the exterior surface of the transfer roll is in contact with a first major surface of a substrate located on the web path. The transfer roll is positioned to receive molten thermoplastic composition from the molten thermoplastic delivery apparatus such that molten thermoplastic composition enters the one or more depressions. A wiping apparatus is in contact with the exterior surface of the transfer roll, the wiping apparatus positioned to remove molten thermoplastic composition from the exterior surface of the transfer roll before the molten thermoplastic composition on the exterior surface of the transfer roll contacts the substrate. A transfer nip is located along the web path, wherein the first major surface of the substrate is forced against the exterior surface of the transfer roll at the transfer nip, whereby at least a portion of the molten thermoplastic composition in the one or more depressions transfers to the first major surface of the substrate during operation of the system to form one or more discrete polymeric regions on the first major surface of the substrate. The system also includes a forming nip located along the web path downstream from the transfer nip, wherein a forming tool is forced against the first major surface of the substrate and the one or more discrete polymeric regions in the forming nip, the forming tool including a plurality of cavities facing the first major surface of the substrate, the plurality of cavities forming a plurality of structures on the one or more discrete polymeric regions.

These and other features and advantages of methods according to the present invention are described below in connection with various illustrative embodiments of the invention.

DETAILED DESCRIPTION OF ILLUSTRATIVE EMBODIMENTS OF THE INVENTION

As discussed above, the present invention provides methods and systems for producing composite webs that include a substrate with discrete polymeric regions located thereon. Various different constructions will now be described to illustrate various embodiments of the composite webs that can be manufactured using the systems and methods of the present invention. These illustrative constructions should not be considered to limit the present invention, which is to be limited only by the claims that follow.

Figure 1:
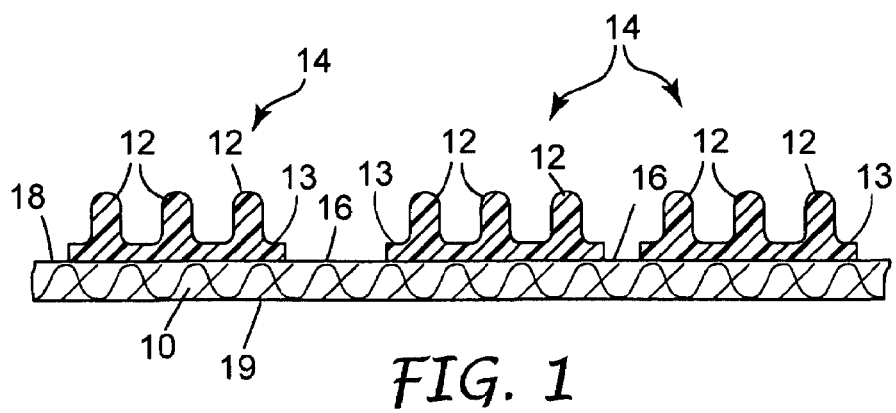
FIG. 1 is a cross-sectional view of one composite web manufactured according to the methods of the present invention.

FIG. 1 is a cross-sectional view of a portion of one composite web manufactured in accordance with the present invention. The composite web includes a substrate 10 with a first major surface 18 and a second major surface 19. A plurality of discrete polymeric regions 14 are located on the first major surface 18 of the substrate 10.

The discrete polymeric regions 14 of composite webs manufactured in accordance with the present invention each include some structure protruding from a base 13. In the embodiment depicted in FIG. 1, the structure is in the form of a plurality of stems 12. The depicted stems 12 are oriented substantially perpendicular to the base 13 of the discrete polymeric regions 14, as well as the underlying substrate 10. Although the stems 12 each include rounded tips, it will be understood that the exact form and structure of the stems 12 may vary based on the intended use of the composite web.

Furthermore, although all of the stems 12 are shown as having the same shape, it will be understood that a variety of differently sized and/or shaped stems may be provided as desired based on the intended use of the composite web.

The different discrete polymeric regions 14 are separated by exposed areas 16 on the first major surface 18 of substrate 10. As depicted in FIG. 1, the spacing, i.e., the size of the exposed area 16 between the discrete polymeric regions 14 may be the same or different. For example, the exposed area 16 located between the left-most pair of discrete polymeric regions 14 is larger than the exposed area 16 located between the right-most pair of discrete polymeric regions 14.

The discrete polymeric regions 14 may cover any desired portion of the surface area of the substrate 10 on which they are positioned, although it will be understood that the discrete polymeric regions 14 will not cover all of the surface of the substrate 10. Some variations in the percentage of surface area occupied by discrete polymeric regions may be as described in, for example, pending U.S. patent application Ser. No. 09/257,447, entitled WEB HAVING DISCRETE STEM REGIONS, filed on Feb. 25, 1999 (published as International Publication No. WO 00/50229).

Further, although the discrete polymeric regions 14 are depicted as being disconnected from each other, it should be understood that some composite webs manufactured with the systems and methods of the present invention may include a relatively thin skin layer of the thermoplastic composition used to form the discrete polymeric regions. Such a skin layer may, in some instances, connect some or all of the discrete polymeric regions on the composite web. In any event, however, the amount of polymeric material in the skin layer will be insufficient to allow for the formation of structures (e.g., stems, hooks, pyramids, etc.) outside of the discrete polymeric regions.

The substrates used in connection with the composite webs of the present invention may have a variety of constructions. For example, the substrates may be a woven material, nonwoven material, knit material, paper, film, or any other continuous media that can be fed through a nip point. The substrates may have a wide variety of properties, such as extensibility, elasticity, flexibility, conformability, breathability, porosity, stiffness, etc. Further, the substrates may include pleats, corrugations or other deformations from a flat planar sheet configuration.

In some instances, the substrates may exhibit some level of extensibility and also, in some instances, elasticity. Extensible webs that may be preferred may have an initial yield tensile force of at least about 50 gm/cm, preferably at least about 100 gm/cm. Further, the extensible webs may preferably be extensible nonwoven webs.

Suitable processes for making a nonwoven web that may be used in connection with the present invention include, but are not limited to, airlaying, spunbond, spunlace, bonded melt blown webs and bonded carded web formation processes. Spunbond nonwoven webs are made by extruding a molten thermoplastic, as filaments from a series of fine die orifices in a spinneret. The diameter of the extruded filaments is rapidly reduced under tension by, for example, by non-eductive or eductive fluid-drawing or other known spunbond mechanisms, such as described in U.S. Pat. No. 4,340,563 (Appel et al.); U.S. Pat. No. 3,692,618 (Dorschner et al.); U.S. Pat. No. 3,338,992 and 3,341,394 (Kinney); U.S. Pat. Nos. 3,276,944 (Levy); U.S. Pat. No. 3,502,538 (Peterson); U.S. Pat. No. 3,502,763 (Hartman) and U.S. Pat. No. 3,542,615 (Dobo et al.). The spunbond web is preferably bonded (point or continuous bonding).

The nonwoven web layer may also be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation.

Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between about 6 to about 19 millimeters are separated and entrained in an air supply and then deposited onto a forming screen, often with the assistance of a vacuum supply. The randomly deposited fibers are then bonded to one another using, for example, hot air or a spray adhesive.

Meltblown nonwoven webs may be formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, meltblown webs must be further bonded such as by through air bonding, heat or ultrasonic bonding as described above.

A web can be made extensible by skip slitting as is disclosed in, e.g., International Publication No. WO 96/10481 (Abuto et al.). If an elastic, extensible web is desired, the slits are discontinuous and are generally cut on the web prior to the web being attached to any elastic component. Although more difficult, it is also possible to create slits in the nonelastic web layer after the nonelastic web is laminated to the elastic web. At least a portion of the slits in the nonelastic web should be generally perpendicular (or have a substantial perpendicular vector) to the intended direction of extensibility or elasticity (the at least first direction) of the elastic web layer. By generally perpendicular it is meant that the angle between the longitudinal axis of the chosen slit or slits and the direction of extensibility is between 60 and 120 degrees. A sufficient number of the described slits are generally perpendicular such that the overall laminate is elastic. The provision of slits in two directions is advantageous when the elastic laminate is intended to be elastic in at least two different directions.

A nonwoven web used in connection with the present invention can also be a necked or reversibly necked nonwoven web as described in U.S. Pat. Nos. 4,965,122; 4,981,747; 5,114,781; 5,116,662; and 5,226,992 (all to Morman). In these embodiments the nonwoven web is elongated in a direction perpendicular to the desired direction of extensibility. When the nonwoven web is set in this elongated condition, it will have stretch and recovery properties in the direction of extensibility.

The substrates used in connection with the present invention may preferably exhibit some porosity on one or both of the major surfaces of the substrate such that when a molten thermoplastic composition is provided on one of the major surfaces of the substrate, a mechanical bond is formed between the molten thermoplastic composition and the substrate as the molten thermoplastic composition infiltrates and/or encapsulates a portion of the porous surface of the substrate. As used in connection with the present invention, the term "porous" includes both structures that include voids formed therein, as well as structures formed of a collection of fibers (e.g., woven, nonwoven, knit, etc.) that allow for the infiltration of molten thermoplastic composition into the interstices between fibers. If the porous surface includes fibers, the thermoplastic composition may preferably encapsulate fibers or portions of fibers on the surface of the substrate.

The type and construction of the material or materials in the substrate should be considered when selecting an appropriate substrate to which a molten thermoplastic composition is applied. Generally, such materials are of the type and construction that do not melt, soften, or otherwise disintegrate under the temperatures and pressures experienced during the step of transferring the thermoplastic composition to the substrate. For example, the substrate should have sufficient internal strength such that it does not fall apart during the process. Preferably, the substrate has sufficient strength in the machine direction at the temperature of the transfer roll to remove it intact from the transfer roll.

As used herein, the term "fiber" includes fibers of indefinite length (e.g., filaments) and fibers of discrete length, e.g., staple fibers. The fibers used in connection with the present invention may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers from the same polymer class (e.g., nylon) but which differ in their properties or characteristics. The term "multicomponent fiber" is thus intended to include, but is not limited to, concentric and eccentric sheath-core fiber structures, symmetric and asymmetric side-by-side fiber structures, island-in-sea fiber structures, pie wedge fiber structures, and hollow fibers of these configurations.

Although the substrates depicted in the various cross-sectional views of the present invention are illustrated as single layer structures, it should be understood that the substrates may be of single or multi-layer construction. If a multi-layer construction is used, it will be understood that the various layers may have the same or different properties, constructions, etc. Some of these variations may be as described in, for example, pending U.S. patent application Ser. No. 09/257,447, entitled WEB HAVING DISCRETE STEM REGIONS, filed on Feb. 25, 1999 (published as International Publication No. WO 00/50229).

The discrete polymeric regions 14 may be formed of a wide variety of different thermoplastic polymeric materials. The thermoplastic compositions used in connection with the methods of the present invention should be capable of flowing or entering into depressions formed in a polymer transfer roll as will be described below. Furthermore, it may be desirable that the thermoplastic compositions also exhibit a relatively high degree of moldability, i.e., the ability to take the shape of a cavity when subjected to the proper conditions of temperature and pressure.

Suitable thermoplastic compositions are those that are melt processable. Such polymers are those that will flow sufficiently to at least partially fill the depressions, yet not significantly degrade during a melt process. A wide variety of thermoplastic compositions have suitable melt and flow characteristics for use in the process of the present invention depending on the geometry of the depressions and the processing conditions. It may further be preferred that the melt processable materials and conditions of processing are selected such that any viscoelastic recovery properties of the thermoplastic compositions do not cause it to significantly withdraw from the wall(s) of the depressions until transfer of the thermoplastic composition to a substrate is desired.

As used in connection with the present invention, "thermoplastic" (and variations thereof) means a polymer or polymeric composition that softens when exposed to heat and returns to its original condition or near its original condition when cooled to room temperature.

Some examples of thermoplastic compositions that may be used in connection with the present invention include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluorocarbons, etc. These materials can be elastomeric or nonelastomeric (e.g., polycarbonates, polymethacrylates, and polyvinylchlorides)

An elastomeric (or elastic) thermoplastic polymer is one that melts and returns to its original condition or near its original condition upon cooling and exhibits elastomeric properties at ambient conditions (e.g., room temperature and pressure). As used in connection with the present invention, "elastomeric" means that the material will substantially resume its original shape after being stretched. Further, the elastomeric materials may preferably sustain only small permanent set following deformation and relaxation which set is preferably no greater than about 30 percent and more preferably no greater than about 20 percent of the original length at moderate elongation, e.g., about 50%. The elastomeric materials can be both pure elastomers and blends with an elastomeric phase or content that will still exhibit substantial elastomeric properties at room temperature. U.S. Pat. No. 5,501,679 (Krueger et al.) provides some further discussion regarding elastomeric materials that may be considered for use in connection with the present invention.

The elastic thermoplastic polymers can include one or more polymers. For example, the polymer could be a blend with an elastomeric phase such that the polymer exhibits elastomeric properties at room temperature. Suitable elastic thermoplastic polymers include block copolymers such as conventional A-B or A-B-A block copolymers (e.g., styrene-isoprene-styrene, styrene-butadiene-styrene, styrene-ethylene-butylene-styrene block copolymers), elastomeric polyurethanes, olefinic elastomers, particularly elastomeric ethylene copolymers (e.g., ethylene vinyl acetates, ethylene/octene copolymer elastomers, ethylene/propylene/diene terpolymer elastomers), as well as mixtures of these with each other, with other elastic thermoplastic polymers, or with nonelastic thermoplastic polymers.

The thermoplastic compositions used in connection with the present invention can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

Figure 2:
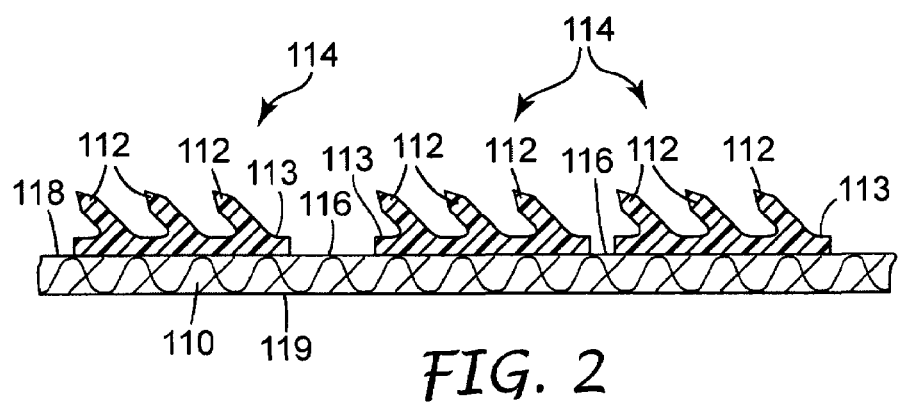
FIG. 2 is a cross-sectional view of another composite web manufactured according to the methods of the present invention.

FIG. 2 depicts another embodiment of a composite web manufactured in accordance with the present invention that includes a substrate 110 on which a plurality of discrete polymeric regions 114 are located. The discrete polymeric regions 114 also include a plurality of stems 112 protruding from a base 113. One difference between the embodiment of FIG. 2 and the embodiment of FIG. 1 is in the orientation of the protruding stems 112 (in FIG. 2). The stems 12 depicted in FIG. 1 are oriented substantially perpendicular to the substrate 10. In contrast, the stems 112 depicted in FIG. 2, are oriented at an acute angle relative to the substrate 110.

The orientation of the stems 112 may be advantageous for a number of reasons. For example, the angled stems 112 may not require a cap or other structure to engage a loop surface or other fibrous substrate adapted to engage the stems 112. The composite web depicted in FIG. 2 may exhibit the ability to fasten to a loop or other surface in a selected direction while releasing when the web is moved in the opposite direction. Such a construction may be particularly useful in connection with an elastic substrate. Although the stems 112 are all shown as being angled in the same direction, it should be understood that the stems provided on a single substrate could be angled in different directions.

The orientation of the stems 112 depicted in FIG. 2 may be provided in a variety of manners. For example, the stems 112 may be manufactured using a tool having holes or cavities that are angled or tilted in the desired direction or directions. Examples of such tools may be described in, for example, U.S. Pat. No. 5,792,411 (entitled LASER MACHINED REPLICATION TOOLING), U.S. Pat. No. 6,190,594 B1 (entitled TOOLING FOR ARTICLES WITH STRUCTURED SURFACES), etc.

Figure 3:
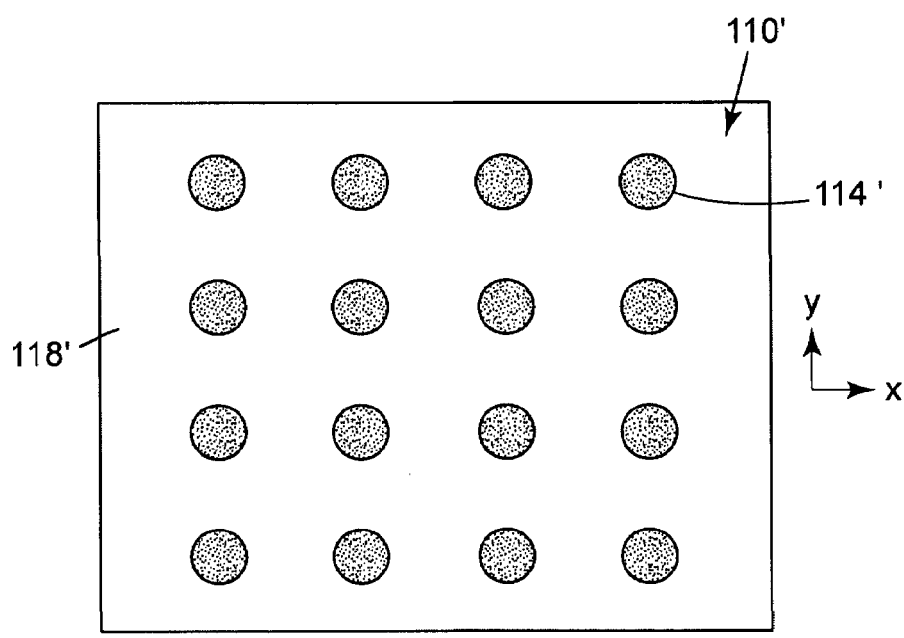
FIG. 3 is a plan view of a composite web manufactured according to the methods of the present invention.

FIG. 3 is a plan view of the composite web of FIG. 2 including a plurality of discrete polymeric regions 114' located on the major surface 118' of a substrate 110'. Although the discrete polymeric regions 114 are shown as being uniformly spaced over the surface of the substrate in a regular, repeating pattern (in both the x and y directions), it should be understood that spacing between the discrete polymeric regions 114 may be non-uniform if so desired. Furthermore, the pattern in which the discrete polymeric regions are arranged, may be irregular and/or non-repeating.

In other variations, portions of the composite webs manufactured in accordance with the present invention may include uniformly-spaced discrete polymeric regions as depicted in FIG. 3 while other portions of the same composite web may be free of any discrete polymeric regions. In yet another alternative, portions of the composite web manufactured in accordance with the present invention may include uniformly spaced discrete polymeric regions as seen in FIG. 3, while other portions of the same composite web may include discrete polymeric regions that are arranged in a non-uniform and/or non-repeating patterns. Further, different portions of a composite web manufactured according to the present invention may include different sets of discrete polymeric regions that are both uniformly spaced in repeating patterns that are different from each other.

Further, the discrete polymeric regions could be provided in any desired shape, e.g., squares, rectangles, hexagons, etc. The shapes may or may not be in the form of recognized geometric shapes, but may be randomly formed with irregular perimeters. In addition, the shapes may not necessarily be solid figures, but may include voids formed within the shape in which none of the thermoplastic composition is transferred. In yet another alternative, some or all of the discrete polymeric regions may be in the form of indicia, i.e., letters, numbers, or other graphic symbols.

Figure 4:
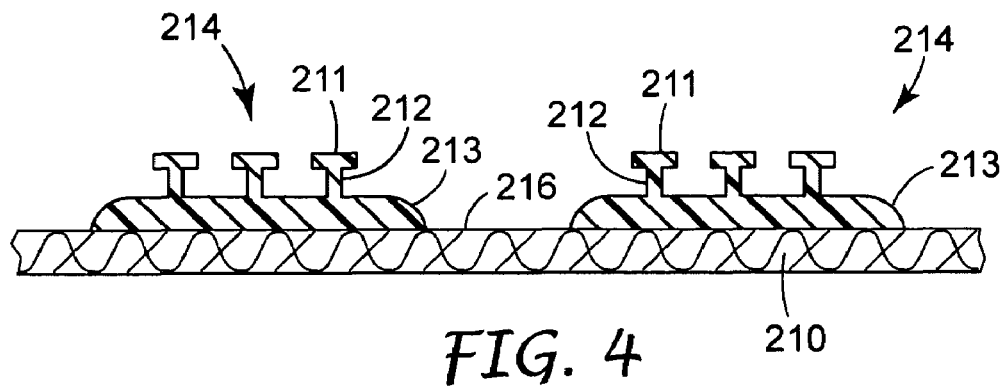
FIG. 4 is a cross-sectional view of a composite web manufactured according to the methods of the present invention including capped stems.

The composite web depicted in the cross-sectional view of FIG. 4 illustrates yet another variation in connection with composite webs manufactured in accordance with the present invention. The composite web of FIG. 4 includes a substrate 210 on which discrete polymeric regions 214 are located. The discrete polymeric regions 214 include a plurality of stems 212 formed thereon and protruding from a base 213. Each of the stems 212 further includes a cap 211. Capped stems are known in the art of mechanical fasteners and may be formed by any of a wide variety of processes. Some of the suitable processes are described in, for example, U.S. Pat. No. 5,077,870 (Melbye et al.), U.S. Pat. No. 5,868,987 (Kampfer et al.), U.S. Pat. No. 6,039,911 (Miller et al.), and U.S. Pat. No. 6,132,660 (Kampfer).

Figure 5:
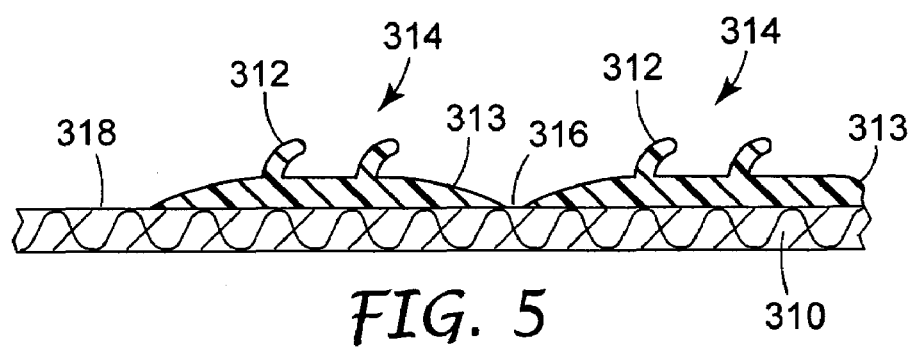
FIG. 5 is a cross-sectional view of a composite web manufactured according to the methods of the present invention including hooks.
Figure 6:
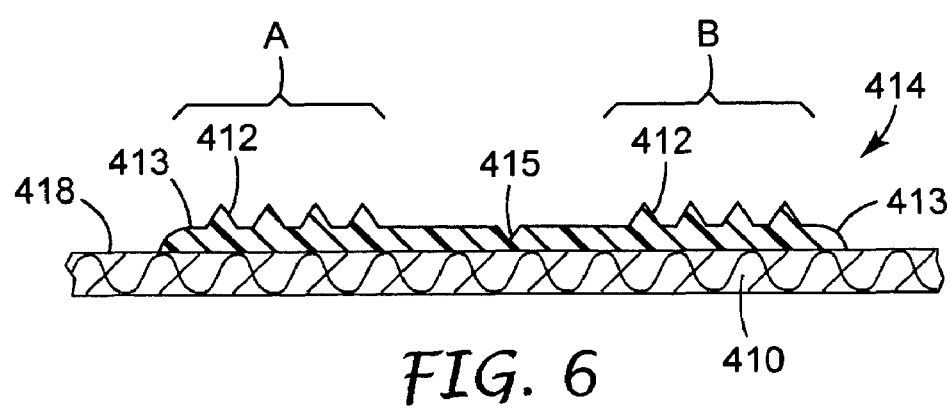
FIG. 6 is a cross-sectional view of a composite web manufactured according to the methods of the present invention including formed structures.

Referring now to FIG. 5, a portion of another composite web manufactured in accordance with the present invention is depicted which includes a plurality of discrete polymeric regions 314 located on a substrate 310. The discrete polymeric regions 314 include hook structures 312 protruding from a base 313 attached to the substrate 310. The bases 313 are depicted as tapering smoothly at their edges which may serve to soften the edges of the discrete polymeric regions 314. In spite of the tapered edges, the discrete polymeric regions 314 are still separated by some portion 316 of the surface 318 of the substrate 310. FIG. 6 depicts yet another variation in a composite web according to the present invention. The variation depicted in FIG. 6 includes a substrate 410 on which a discrete polymeric region 414 is located. The discrete polymeric region 414 includes a number of structures 412 protruding from a base 413. The protruding structures 412 may be in the form of pyramids or cones that may, e.g., provide some abrasive properties to the composite web.

Another feature depicted in FIG. 6 is that the base 413 of the discrete polymeric region 414 may include one or more notches 415. Such notches 415 may improve the flexibility and/or conformability of the composite webs of the present invention because of the ability of the base 413 to flex in response to bending stresses on the composite web. Still another variation depicted in FIG. 6 is that the different portions (A & B in FIG. 6) may include different numbers of structures 412 at different spacing. Another variation is that the height of the structures 412 above the base 413 and/or substrate 410 also varies in the different portions of the discrete polymeric region 414.

Figure 7:
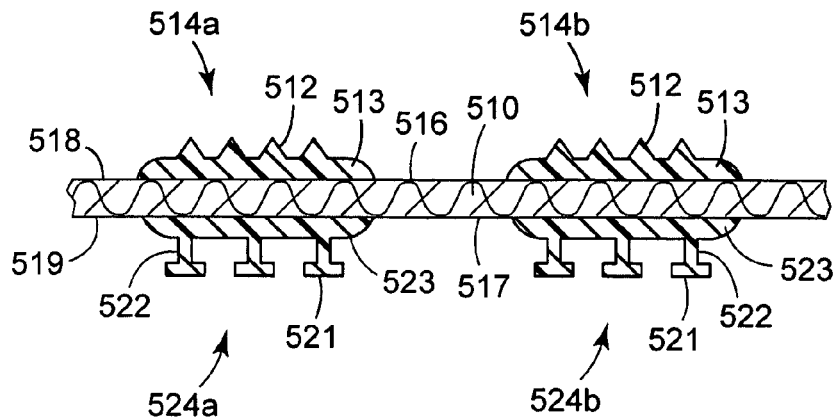
FIG. 7 is a cross-sectional view of a composite web manufactured according to the methods of the present invention including discrete polymeric regions on both major surfaces of a substrate.

FIG. 7 illustrates yet another embodiment of a composite web manufactured in accordance with the present invention. The composite web includes a substrate 510 with opposing major surfaces 518 and 519. One feature illustrated in FIG. 7 is the two-sided nature of the discrete polymeric regions located on the opposing major surfaces 518 and 519, respectively.

Discrete polymeric regions 514a and 514b are provided on major surface 518 and each include structures 512 protruding from a base 513 attached to the substrate 510. Discrete polymeric regions 524a and 524b are provided on opposing major surface 519 and include stems 522 that terminate in caps 521.

The discrete polymeric regions on opposing major surfaces are depicted as being in registration through the substrate 510. In other words, the discrete polymeric regions 514a and 514b are aligned with the discrete polymeric regions 524a and 524b on the opposite side of the substrate 510. Further, the discrete polymeric regions 514a and 514b are depicted as being substantially the same size as the discrete polymeric regions 524a and 524b located on the opposite side of the substrate 510. It should, however, be understood that when a composite web having discrete polymeric regions on both major surfaces is desired, the discrete polymeric regions on the opposing surfaces may or may not be the same size as seen in FIG. 7. Also, it should be understood that the discrete polymeric regions may or may not be in registration with each other through the substrate 510 as seen in FIG. 7.

Figure 8:
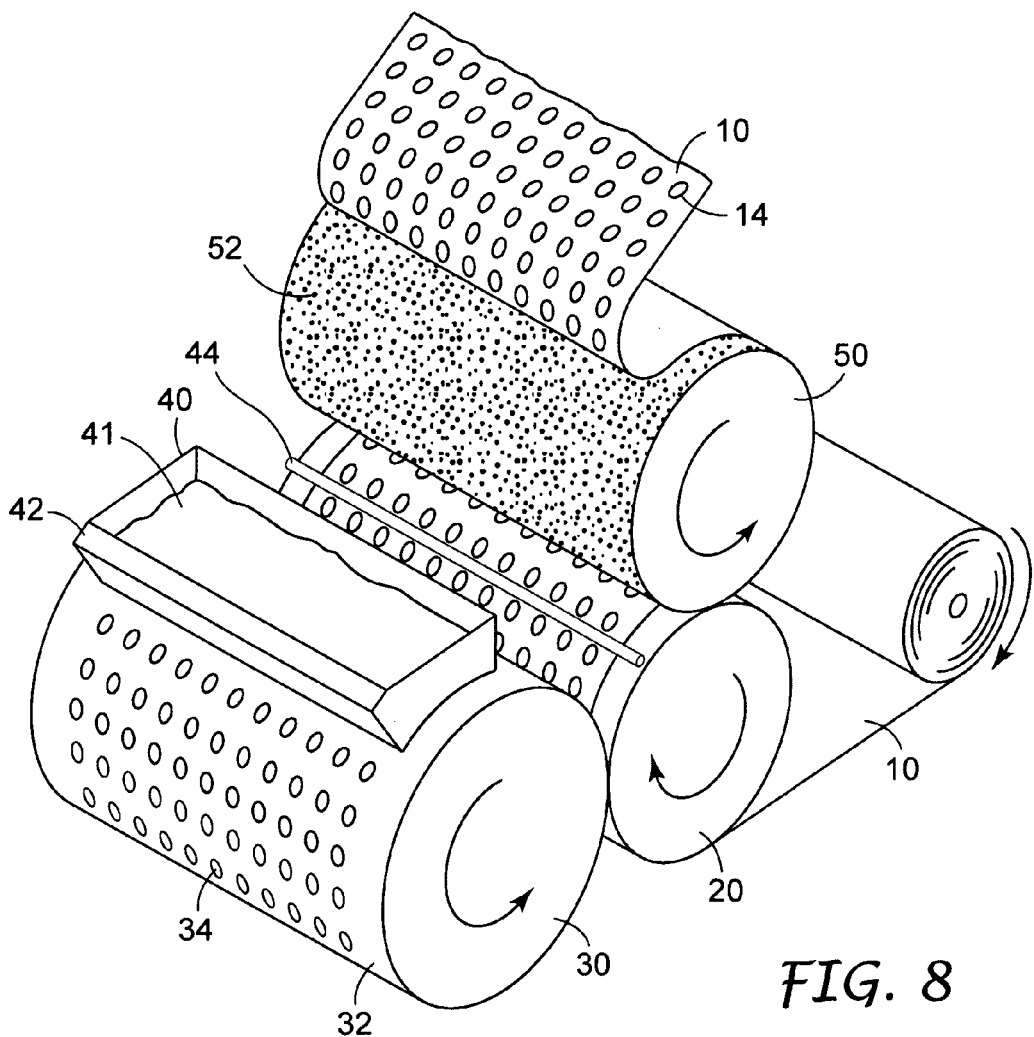
FIG. 8 is a perspective view of one polymer transfer process useful in providing discrete polymeric regions on a substrate in accordance with the methods of the present invention.

FIG. 8 is a perspective view of one system and method of providing discrete polymeric regions on one surface of a substrate 10 in accordance with the principles of the present invention. The system depicted in FIG. 8 includes a substrate 10 that defines a web path through the system. The substrate 10 moves through the system in a downstream direction indicated by the rotation arrows on the various rolls. After being unwound or otherwise provided from a supply (e.g., the substrate 10 may be manufactured in-line with the system depicted in FIG. 8), the substrate 10 is directed into a transfer nip formed between a backup roll 20 and a transfer roll 30.

The process of providing discrete polymeric regions on the substrate 10 includes delivering a supply of a molten thermoplastic composition to the exterior surface 32 of transfer roll 30 that includes a one or more depressions 34 formed in its exterior surface 32. The molten thermoplastic composition 41 is supplied to the exterior surface 32 of the transfer roll 30 by a delivery apparatus in the form of a trough 40 (or other supply apparatus, e.g., extruder, gear pump, etc.). The excess molten thermoplastic composition is wiped or removed from the exterior surface 32 by a doctor blade 42 acting against the exterior surface 32 of the transfer roll 30. Although it may be ideal to remove all of the thermoplastic composition from the exterior surface 32 of the transfer roll 30, some of the thermoplastic composition may remain on the exterior surface 32 after wiping by the doctor blade 42.

The depressions 34 formed in the exterior surface 32 of the transfer roll 30 preferably receive a portion of the molten thermoplastic composition when the molten thermoplastic composition is deposited on the exterior surface 32 of the transfer roll 30. If the depressions 34 are not completely filled during or by the deposition of molten thermoplastic composition, the wiping action of the doctor blade 42 on the exterior surface 32 of the transfer roll 30 may assist in substantially filling the depressions with molten thermoplastic composition.

Control over the temperatures of the various rolls in the system depicted in FIG. 8 may be useful in obtaining the desired products. It may be preferred, e.g., that the exterior surface 32 of the transfer roll 30 be heated to a selected temperature that is at or above the melt temperature of the thermoplastic composition to be transferred to the substrate 10. Heating the transfer roll 30 may also enhance filling of the depressions 34 by the molten thermoplastic composition.

Because the molten thermoplastic composition 41 is itself heated within the trough 40, the doctor blade 42 will typically be heated by the molten thermoplastic composition. It may alternatively be desirable to control the temperature of the doctor blade 42 separately from the trough 40 containing the molten thermoplastic composition 41. For example, it may be desirable to heat the doctor blade 42 to a temperature above the melt temperature of the molten thermoplastic composition.

Figure 8A:
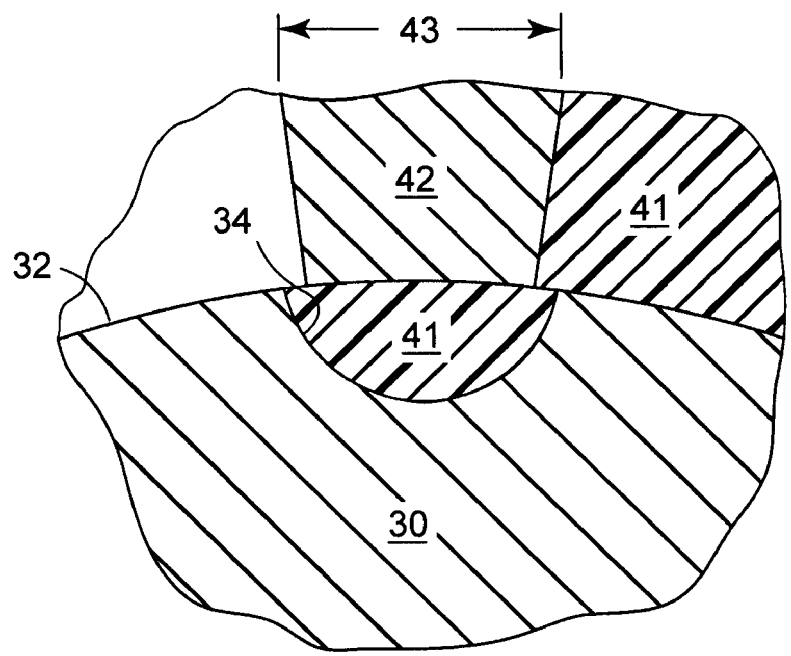
FIG. 8A is an enlarged partial cross-sectional view depicting wiping of the transfer roll by a doctor blade.

FIG. 8A is an enlarged partial cross-sectional view depicting one relationship between a doctor blade 42 and depression 34 in a transfer roll 30. Another characteristic of the doctor blade 42 that may be controlled is its thickness or length 43 along the exterior surface of the transfer roll 30 (as measured in the machine direction or the direction of rotation of the transfer roll). For example, a thicker or longer doctor blade 42 may help by allowing the molten thermoplastic composition more time to relax within the depressions 34, thereby improving filling of the depressions. In addition to varying the length of the doctor blade 42, the pressure or force exerted on the transfer roll 30 by the doctor blade 42 may also be adjusted based on a variety of factors including, e.g., the characteristics of the molten thermoplastic composition, the transfer roll characteristics, etc.

With the depressions 34 at least partially filled with the desired molten thermoplastic composition, the transfer roll 30 continues to rotate until the depressions 34 and the molten thermoplastic composition they contain are forced into contact with the substrate 10 against backup roll 20 at the transfer nip (i.e., the nip formed by the transfer roll 30 and the backup roll 20. It is at this point that transfer of the molten thermoplastic composition in the depressions 34 to the substrate 10 begins. It should be understood that under certain conditions, only a portion of the thermoplastic composition in the depressions 34 may transfer to the substrate 10.

When a substrate 10 that includes one or more porous major surfaces on which the molten thermoplastic composition is deposited is used in connection with the methods of the present invention, a mechanical bond is preferably formed by infiltration of the molten thermoplastic composition into the porous surface of the substrate 10. As used in connection with the present invention, the term "porous" includes both structures that include voids formed therein, as well as structures formed of a collection of fibers (e.g., woven, nonwoven, or knit) that allow for the infiltration of molten thermoplastic compositions.

The nip pressure between the transfer roll 30 and the backup roll 20 is preferably sufficient such that a portion of the thermoplastic composition in the discrete polymeric regions infiltrates and/or encapsulates a portion of the porous substrate 10 to improve attachment of the discrete polymeric regions to the substrate 10. Where the surface of the substrate 10 includes fibers (e.g., where the substrate 10 includes woven, nonwoven, or knit materials on its major surfaces), it may be preferred that the thermoplastic composition encapsulate all or a portion of at least some of the fibers on the surface of the substrate 10 to improve attachment of the discrete polymeric regions to the substrate 10.

Under some conditions the molten thermoplastic composition in the depressions 34 may completely permeate the substrate 10 if, e.g., the substrate 10 is porous throughout its thickness. In other instances, penetration of the molten thermoplastic composition may be limited to the outer layer or layers of the substrate 10.

It should, however, be understood that although the outer surfaces of the substrate 10 may exhibit some porosity, that porosity may not necessarily extend through the entire thickness of the substrate 10. For example, the substrate 10 may have a variety of different layers, with one of the layers being substantially non-porous. In another alternative, the overall thickness of the substrate 10 may render it non-porous as a whole, even though the outer surfaces of the substrate 10 exhibit some porosity as discussed above.

The backup roll 20 may possess a variety of different characteristics depending on the types of substrate materials and/or molten thermoplastic compositions being processed. In some instances, the exterior of the backup roll 20 may be a rubber or other conformable material that conforms to the shape of the transfer roll 30. If a conformable material such as rubber is used, it may, e.g., have a durometer of, e.g., about 10–90 Shore A.

Figure 8B:
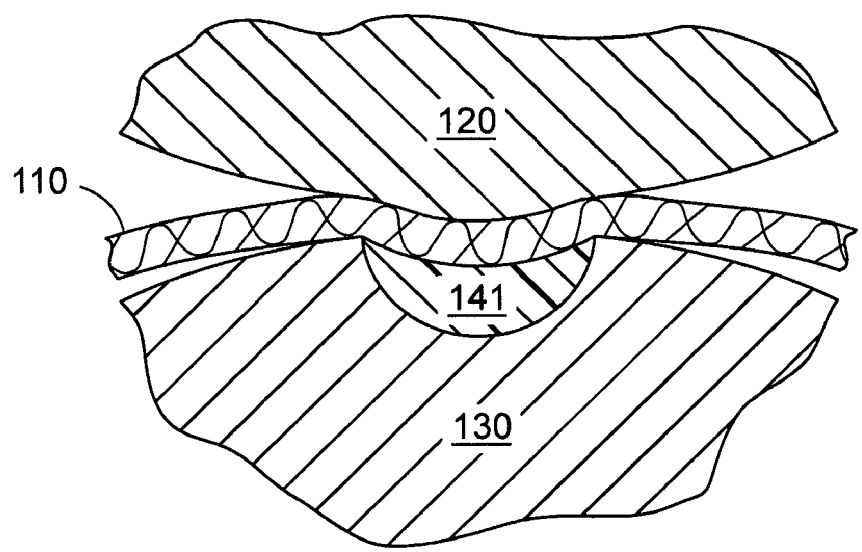
FIG. 8B is an enlarged partial cross-sectional view depicting a conformable backup roll forcing a substrate against a transfer roll.

One such variation at the transfer nip is depicted in FIG. 8B, in which a conformable backup roll 130 is depicted as forcing a portion of the substrate 110 into the depression 134 (and the thermoplastic composition 141 contained therein). If the surface of the substrate 110 facing the depression 134 is porous, a portion of the molten thermoplastic composition 141 may infiltrate the porous surface of the substrate 110. Forcing the substrate 110 into the depression may be particularly beneficial if the depression 134 is not completely filled with the molten thermoplastic composition 141 to improve the likelihood of contact between the substrate 10 and the molten thermoplastic composition 141.

Figure 8C:
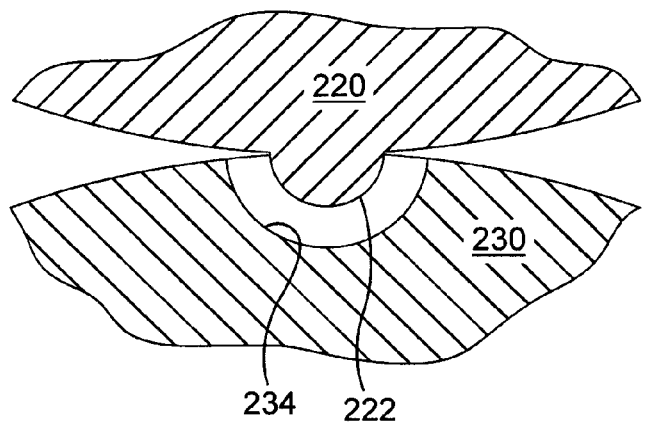
FIG. 8C is an enlarged partial cross-sectional view depicting a mating backup roll including protrusions aligned with depressions in the transfer roll.

Alternatively, the surface of the substrate may be forced into the depressions on the transfer roll using a mating backup roll. This variation at the transfer nip is depicted in FIG. 8C in which the backup roll 220 includes protrusions 222 that are complementary to or mate with the depressions 234 on the transfer roll 230. The protrusions 222 would preferably force a substrate into the depressions with the same results and benefits described above with respect to FIG. 8B. A mating backup roll 220 could be formed of any conformable material, nonconformable material, or combination of conformable or nonconformable materials.

Heating or otherwise controlling the temperature of the transfer roll is discussed above. It should also be appreciated that the temperature of the exterior surface of the backup roll may be controlled. For example, it may be desirable to cool the surface of the backup roll to a selected temperature below the temperature of the transfer roll. Cooling of the backup roll may be beneficial in maintaining the integrity of the substrate, particularly if the substrate integrity can be degraded from the heat of the transfer roll (if the transfer roll is heated) and/or the molten thermoplastic composition in the depressions of the transfer roll.

The substrate 10 continues around the backup roll 20 as seen in FIG. 8. In some instances, a portion of the molten thermoplastic composition in the depressions may remain in the depressions 34 while the substrate 10 is pulled away from the transfer roll 30. As a result, the molten thermoplastic composition in the depressions 34 may tend to elongate or string between the depressions in transfer roll 30 and the substrate 10.

A device, such as a hot wire 44 seen in FIG. 8, may be used to sever any strands of thermoplastic composition that may be formed as the substrate 10 separates from the transfer roll 30. Other devices and/or techniques may be used to accomplish the desired severing of any molten thermoplastic composition strands. Examples may include, but are not limited to hot air knives, lasers, etc. Furthermore, under certain conditions, stringing of the thermoplastic composition may not be encountered during manufacturing.

The tendency of the molten thermoplastic composition in the depressions 34 to string as the substrate exits the transfer nip also raises another issue that should be considered when developing processes according to the present invention. That issue is the internal cohesive strength of the substrate 10 and/or the tensile strength of the substrate 10. This issue may be of more concern if the substrate 10 includes a fibrous construction (e.g., woven, nonwoven, or knit fibers) that could be separated from the remainder of the substrate by the forces exerted when the substrate 10 is pulled away from the transfer roll 30. These considerations may be more important if the molten thermoplastic composition has properties (e.g., tackiness, tensile strength, etc.) such that strands of the molten thermoplastic composition can exert forces on the substrate 10 that exceed the internal cohesive strength and/or tensile strength of the substrate 10.

For example, if the substrate 10 includes a resin-bonded nonwoven portion, the temperature of the transfer roll 30 and/or molten thermoplastic composition may rise above the melting temperature of the resin, thereby potentially degrading the internal cohesive strength and/or tensile strength of the substrate 10. Alternatively, a nonwoven substrate may include fibers that have a melting temperature similar to the temperature of the transfer roll 30 and/or molten thermoplastic composition, thereby potentially degrading the internal cohesive strength and/or tensile strength of the substrate 10.

In either instance, the roll temperatures and/or molten thermoplastic composition temperature may need to be controlled to maintain the integrity of the substrate while transferring the molten thermoplastic composition. For example, the backup roll 20 may be cooled to, in turn, cool the substrate 10 to maintain its internal cohesive strength.

In another alternative, heating of the transfer roll 30 and/or backup roll 20 may be used to enhance the internal cohesive strength and/or tensile strength of the substrate 10. For example, if the substrate 10 includes multi-component fibers or fibers having different compositions, some consolidation of the fibers or other components in the substrate 10 may be caused by heating the substrate 10 while transferring the molten thermoplastic composition from the transfer roll 30 to the substrate 10. That consolidation may improve the integrity of the substrate by forming a skin layer or other strength-enhancing structure on or within the substrate 10. Some exemplary processes may be described in, e.g., U.S. Pat. No. 5,470,424 (Isaac et al.).

The system and method depicted in FIG. 8 also includes a forming tool 50 which, in the depicted embodiment, also acts against backup roll 20 to provide a forming nip that is downstream of the transfer nip in the depicted system. Although the forming tool 50 is depicted as providing the forming nip with that same backup roll 20 used to form the transfer nip (with transfer roll 30), it will be understood that the forming nip could be provided by positioning the forming tool 50 to form a nip with a different roll. Using the same backup roll for both the transfer nip and the forming nip, may, however, be beneficial in that fewer system components and/or floorspace may be required for the system.

In systems and methods where the transfer nip and the forming nip are separated, i.e., they are not located on the same backup roll 20, it will be understood that the two processes, i.e., transferring and forming, may be separated in time and/or space. If the transferring nip and the forming nip are separated from each other such that the thermoplastic composition in the discrete polymeric regions is no longer sufficiently molten to form structures in the forming nip, the discrete polymeric regions on the substrate may need to be heated before passing through the forming nip. For example, the discrete polymeric regions could be deposited on a substrate which could then be wound into a roll. The wound substrate with discrete polymeric regions could then be unwound later and directed into a forming nip after heating (by contact or noncontact heat sources).

The forming tool 50 is provided in the form of a roll and includes cavities 52 formed in its surface. Forming tools such as that depicted in FIG. 8 are well known to those of skill in the art. Some forming tools are described in, for example, U.S. Pat. No. 4,984,339 (Provost et al.), U.S. Pat. No. 5,077,870 (Melbye et al.), U.S. Pat. No. 5,755,015 (Akeno et al.), U.S. Pat. No. 5,868,987 (Kampfer et al.), U.S. Pat. No. 6,132,660 (Kampfer), U.S. Pat. No. 6,190,594 B1 (Gorman et al.), U.S. Pat. No. 6,287,665 B1 (Hammer), etc.

The forming tool 50 and/or backup roll 20 may be heated or cooled to a selected temperature based on the properties of the thermoplastic composition being formed to enhance forming of the discrete polymeric regions by the cavities 52 in the forming tool 50. For example, it may be desirable to heat or cool the forming tool 50 to enhance the forming process. Depending on the speed of the process and other factors, the discrete regions of thermoplastic composition located on substrate 10 may also advantageously retain some of their molten nature as transferred to the substrate 10.

In any event, a portion of the thermoplastic composition in discrete polymeric regions 14 located on the substrate 10 enters the cavities 52 on the forming tool 50. As a result, structures such as the stems depicted in FIGS. 1 & 2 may be formed in the discrete polymeric regions 14 located on substrate 10.

In some instances, the thermoplastic composition provided in discrete regions on the substrate 10 may possess properties (e.g., viscosity, etc.) such that the thermoplastic composition replicates the shape of the cavities 52 provided in the forming tool 50. As used herein, the term "replicates" (and variations thereof) includes complete replication as well as partial replication of the shape of the cavities 52 by the thermoplastic composition. In other instances, the properties (e.g., viscosity, etc.) may result in forming of the thermoplastic composition on the substrate 10 into shapes that, although they differ from the shape of the thermoplastic composition before forming by the forming tool 50, do not replicate the shape of the cavities 52 as described above.

Figure 8D:
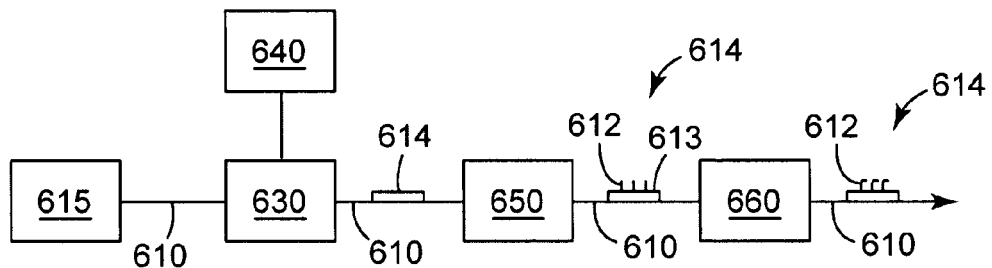
FIG. 8D is a schematic diagram of an alternative system for manufacturing composite webs in accordance with the present invention.

FIG. 8D is a schematic diagram of another system according to the present invention. The system of FIG. 8D includes a supply 615 of substrate 610 directed into a transfer nip 630. A molten thermoplastic composition delivery apparatus 640 provides molten thermoplastic composition to the transfer nip 630 which preferably includes a transfer roll with depressions and a wiping apparatus (e.g., doctor blade) as described above.

At the transfer nip 630, discrete polymeric regions 614 are transferred to the substrate 610 which is then directed into a forming nip 650 that preferably includes a forming tool (e.g., as described above) to form structures 612 protruding from a base 613 of the discrete polymeric regions 614.

The substrate 610 with structured polymeric regions 614 can then, optionally, be directed into a deforming station 660 at which the structures 612 formed at the forming nip 650 are deformed. The deforming station 660 may, for example, perform a variety of processes to deform the structures 612 after they are formed at the forming nip 650. Examples of some suitable processes that may be performed at the deforming station include, but are not limited to, trimming, shaving, abrading heating or melting (using a contact or noncontact heat source), bending or otherwise distorting the structures. Where the structures 612 are stems, the deforming may include, e.g., forming a cap on the stem, forming a hook on a stem, bending the stem, etc. Some potential apparatus and processes are described in, for example, U.S. Pat. No. 5,077,870 (Melbye et al.), U.S. Pat. No. 5,868,987 (Kampfer et al.), U.S. Pat. No. 6,039,911 (Miller et al.), U.S. Pat. No. 6,054,091 (Miller et al.), and U.S. Pat. No. 6,132,660 (Kampfer).

Although the system and method depicted in FIG. 8 produces composite webs with discrete polymeric regions on only one major side thereof, those of skill in the art will recognize the modifications required to provide discrete polymeric regions on both major surfaces of the substrate in accordance with the principles of the present invention. One example may include, e.g., forming discrete polymeric regions on one surface of each of two separate substrates, with the two substrates then being laminated together to form a single substrate with discrete polymeric regions on both major surfaces (see, e.g., FIG. 7). Alternatively, a single substrate may be directed into a nip formed by two transfer rolls, with each of the transfer rolls depositing discrete polymeric regions on both sides of the web essentially simultaneously.

Figure 9:
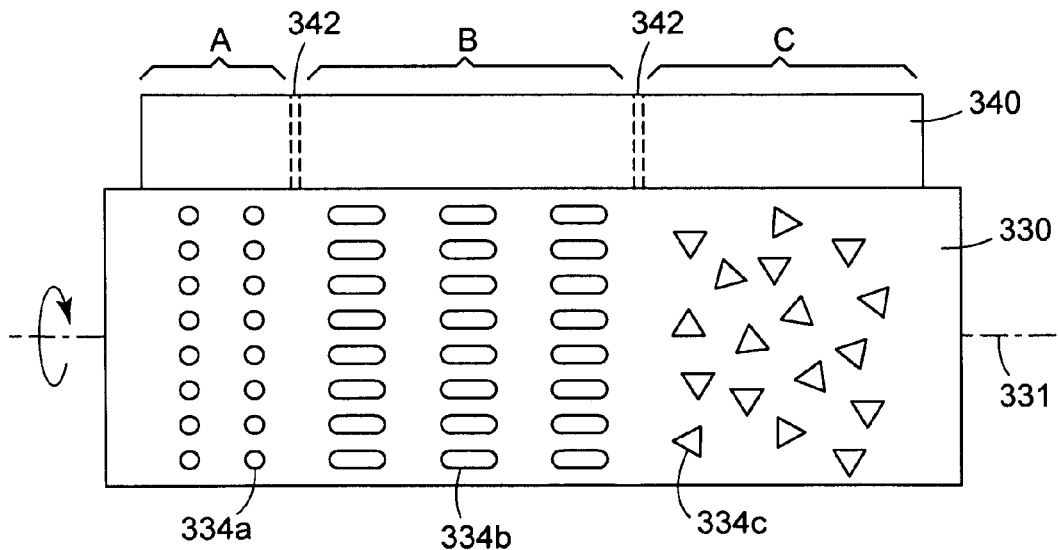
FIG. 9 illustrates another transfer roll and polymer source useful in connection with zoned delivery systems and methods.

Although FIG. 8 depicts the application of only one thermoplastic composition using the transfer roll 30, it will be understood that two or more different thermoplastic compositions may be applied to the exterior surface of the transfer roll 30. FIG. 9 depicts a portion of one system in which a trough 340 is used to deliver three molten thermoplastic compositions (in zones A, B, & C) to the surface of a transfer roll 330 that rotates about an axis 331. The trough 340 may, for example, include barriers 342 such that molten thermoplastic compositions in the different zones of the trough 340 do not mix during processing. In another alternative, separate and distinct troughs could be used for each different thermoplastic composition to be applied to the transfer roll 330.

The transfer roll 330 also includes different sets of depressions 334a, 334b, and 334c over which the different molten thermoplastic compositions may be applied. The depressions in the different zones on transfer roll 330 are differently shaped, have different sizes, and have different spacings. For example, the triangular depressions in zone C are arranged in an irregular, non-repeating pattern while the depressions in zones A & B are arranged in regular, repeating patterns.

With the system of FIG. 9, different sets of discrete polymeric regions may be formed on a single substrate using different thermoplastic compositions. As a result, the thermoplastic compositions may be selected for any of a number of different properties related to manufacturing or end-use performance of the finished articles made using the composite webs.

Figure 10:
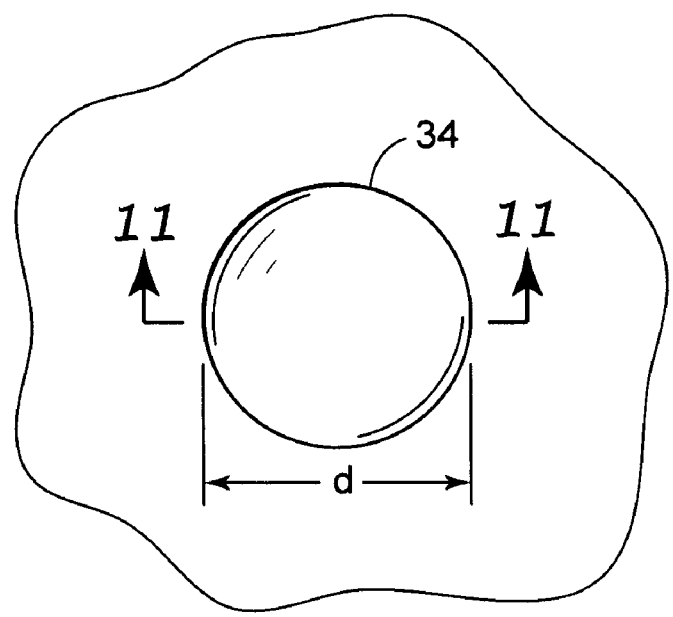
FIG. 10 is a plan view of one depression on a transfer roll that may be used in connection with the methods of the present invention.
Figure 11:
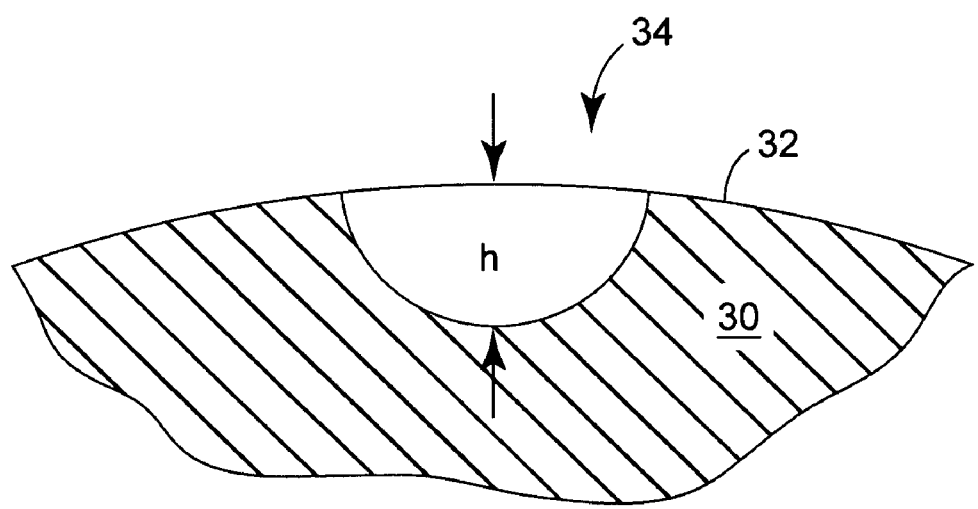
FIG. 11 is a cross-sectional view of the depression of FIG. 10 taken along line 11—11 in FIG. 10.

FIG. 10 is a plan view of one exemplary depression 34 in transfer roll 30 of the present invention, while FIG. 11 is a cross-sectional view of the depression 34 taken along line 11—11 in FIG. 10. The depression 34 has a circular footprint (i.e. shape of the opening into the depression 34 at the surface 32 of the roll) with a diameter represented by the letter d. The depression 34 has a depth (represented by the letter h) measured from the exterior surface 32 of the transfer roll 30.

Transfer rolls used in connection with the present invention preferably include depressions that are large enough to form discrete polymeric regions of sufficient size to support, for example, the formation of multiple stems or other structures in each of the discrete polymeric regions. The depressions may be characterized in a variety of manners. For example, the depressions 34 may be characterized in terms of the area occupied by their footprint on the exterior surface of the forming tool, a maximum dimension of the footprint (in any direction on the surface of the roll), the volume of the depression, the shape of the footprint, etc.

When characterized in terms of the area occupied by the footprint of the depressions, each of the depressions 34 may have a footprint with an area of about 4 square millimeters ($mm^2$) or more. In other situations, each of the depressions 34 may have footprints with an area of about 8 $mm^2$ or more.

Another manner in which the depressions may be characterized is in terms of the largest footprint dimension as measured on the surface 32 of the transfer roll 30. For a depression with a circular footprint as seen in FIGS. 10 and 11, the largest dimension is the same in all directions, but the depressions used in connection with the present invention may take any desired shape (e.g. elongated, irregular, etc.) in which the largest dimension will occur in one or more directions on the exterior surface of the transfer roll 30, but not in others. When characterized in terms of the largest footprint dimension, it may be that the depressions have a largest footprint dimension of about 2 mm or more, in some instances about 5 mm or more.

Yet another manner in which the depressions used in connection with the present invention may be characterized is in terms of volume. For example, the depressions may have a depression volume of at least about three (3) cubic millimeters ($mm^3$) or more, or alternatively, a depression volume of about five (5) cubic millimeters. Volume of the discrete polymeric regions may be important to provide enough of the thermoplastic composition to adequately enter the cavities in a forming tool. Depression volume may also be important because at least some of the molten thermoplastic composition may be retained within the depression during the transfer process, i.e., the depression volume may preferably be oversized relative to the preferred volume of the discrete polymeric regions to compensate for retention of thermoplastic composition within the depressions.

Figure 12:
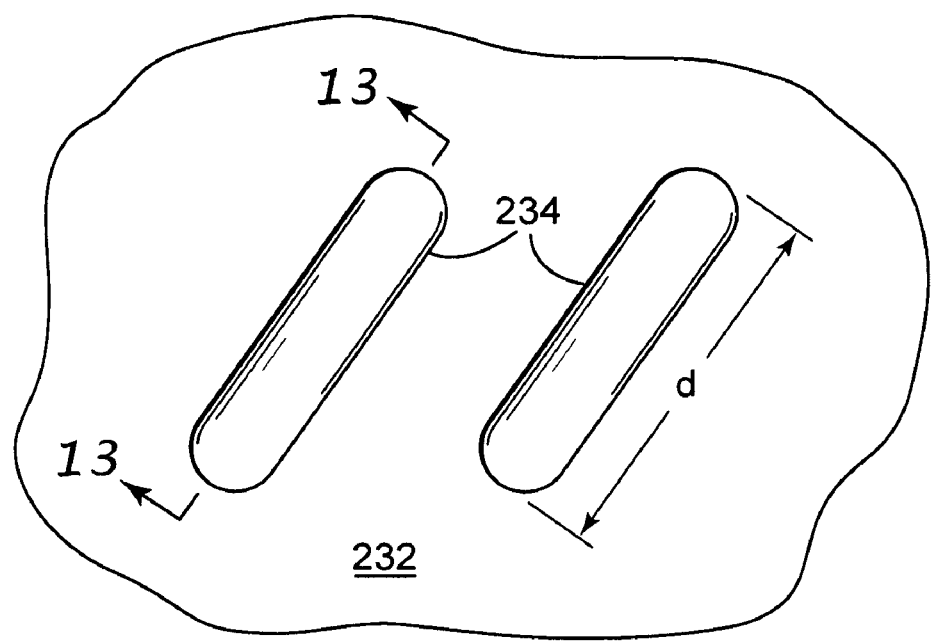
FIG. 12 is a plan view of alternative depressions on a transfer roll that may be used in connection with the methods of the present invention.
Figure 13:
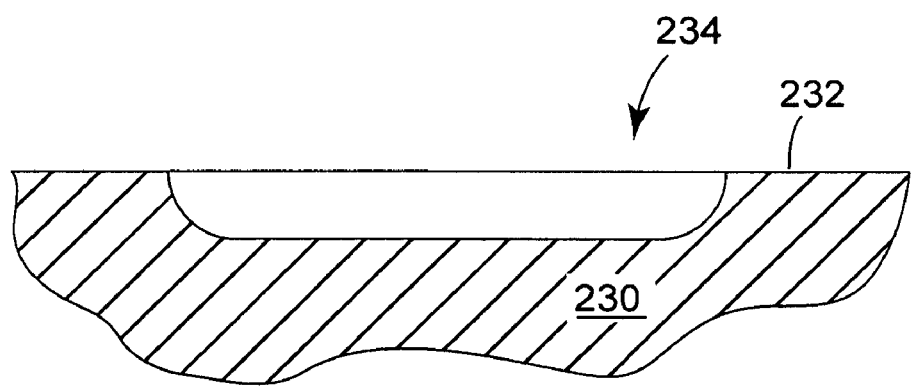
FIG. 13 is a cross-sectional view of one depression of FIG. 12 taken along line 13—13 in FIG. 12.

FIG. 12 depicts two depressions 234 formed in an exterior surface 232 of a transfer roll, with FIG. 13 being a cross-sectional view of one of the depressions 234 taken along line 13—13 in FIG. 12. The depressions 234 have elongated shapes in the form of, e.g., a trough. When compared to the circular depression 34 seen in FIGS. 10 and 11, the longer depressions 234 of FIGS. 12 and 13 would have a larger footprint dimension along their elongated direction than transverse to their elongated direction.

The orientation of the depressions 234 may be selected based on a variety of factors. The elongated depressions 234 may be aligned in the machine direction (i.e., the direction of travel of a substrate), in the cross-web direction (i.e., transverse to the direction of travel of the substrate), or any other orientation between machine direction or cross-web direction.

Figure 14:
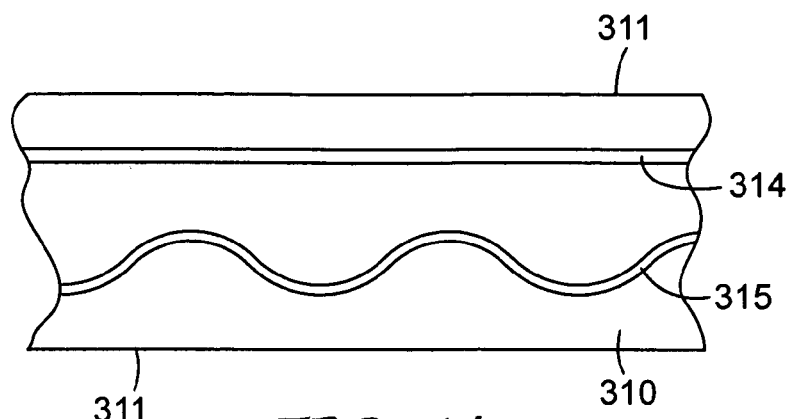
FIG. 14 is a plan view of a portion of one composite web manufactured according to the present invention.
Figure 15:
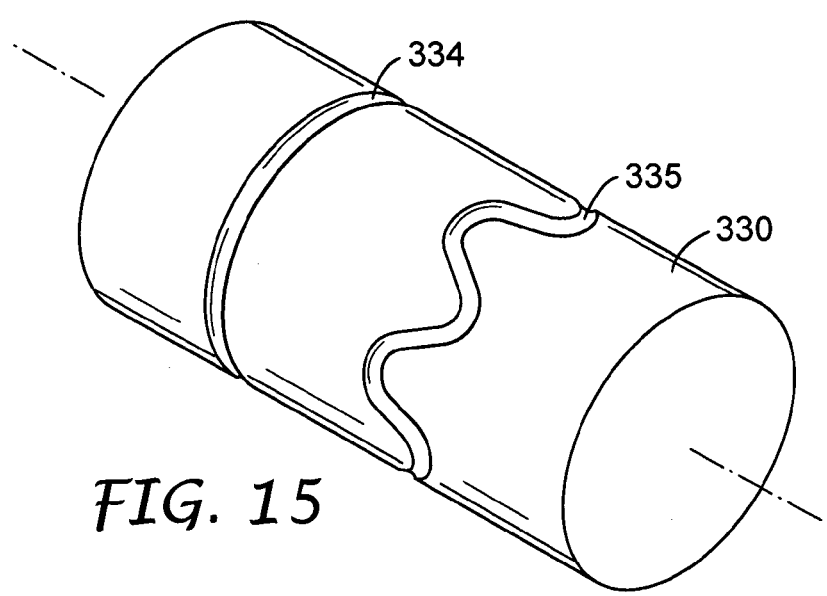
FIG. 15 is a perspective view of one transfer roll that may be used to manufacture the composite web of FIG. 14.

FIGS. 14 & 15 depict another variation associated with the methods of manufacturing composite webs according to the present invention. FIG. 14 depicts, in a plan view, a portion of a composite web manufactured according to the present invention. The composite web includes a substrate 310 on which two discrete polymeric regions 314 and 315 are located. The backing includes two opposing edges 311 that extend over the length of the composite web and, together, define the longitudinal length of the composite web.

Discrete polymeric region 314 is provided in the shape of a line of the thermoplastic composition material deposited on the substrate 310 along the general direction of the longitudinal length of the composite web. The discrete polymeric region 314 may be continuous along the longitudinal length of the composite web as shown in FIG. 14.

Discrete polymeric region 315 is a variation of discrete polymeric region 314 in that it is provided in an undulating shape as compared to the relative straight linear shape of the discrete polymeric region 314. The undulating shape of the discrete polymeric region 315 also, however, extends along the direction of the longitudinal length of the composite web. Further, the discrete polymeric region 315 may be continuous along the longitudinal length of the composite web as shown in FIG. 14.

FIG. 15 is a perspective view of one transfer roll 330 that may be used to transfer thermoplastic compositions in the shapes seen in FIG. 14 according to the methods of the present invention. The transfer roll 330 includes a depression 334 that preferably extends continuously around the outer circumference of the roll 330 to form the discrete polymeric region 314 as depicted in FIG. 14. The transfer roll 330 also includes a depression 335 that also extends around the outer circumference of the roll 330 to form the discrete polymeric region 315 as depicted in FIG. 14.

Figure 16:
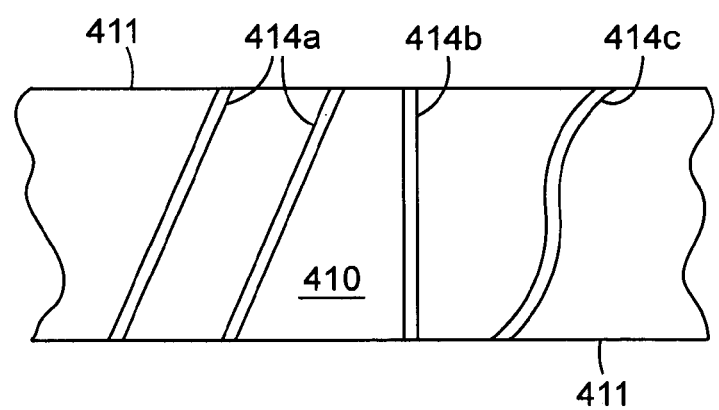
FIG. 16 is a plan view of a portion of one composite web manufactured according to the present invention that includes discrete polymeric regions extending across the width of the substrate.

FIG. 16 depicts another variation associated with the methods of manufacturing composite webs according to the present invention. FIG. 16 depicts, in a plan view, a portion of a composite web manufactured according to the present invention. The composite web includes a substrate 410 on which discrete polymeric regions 414a, 414b, and 414c are located, with the discrete polymeric regions extending across the width of the substrate. The substrate 410 includes two opposing edges 411 that extend over the length of the composite web and, together, define the width and the longitudinal length of the composite web.

Each of the discrete polymeric regions 414a, 414b, and 414c is provided in the shape of a line of the thermoplastic composition material deposited on the substrate 410 in a generally cross-web direction, i.e., extending between the opposing edges 411 of the substrate 410. The discrete polymeric regions 414a, 414b, and 414c present variations from straight lines 414a and 414b to undulating line 414c. Many other variations in placement, shape and/or orientation of discrete polymeric regions may be envisioned in connection with methods according to the present invention.

In addition to the deposition of thermoplastic polymer in discrete regions, it is also contemplated that additional materials can be coated onto a major surface of the substrate using known methods. Such materials could be, for example adhesives, as described in, e.g., U.S. Pat. No. 5,019,071 (Bany et al.); U.S. Pat. No. 5,028,646 (Miller et al.); and U.S. Pat. No. 5,300,057 (Miller et al.); or cohesives as described in, e.g. U.S. Pat. No. 5,389,438 (Miller et al.) and U.S. Pat. No. 6,261,278 (Chen et al.).

EXAMPLES

The following examples are provided to enhance understanding of the present invention. They are not intended to limit the scope of the invention.

Example 1

A web of the present invention was produced using apparatus similar to that shown in FIG. 8. A 5 cm diameter single screw extruder was used to deliver molten ultra low density polyethylene (ENGAGE 8402, 30 MI, DupontDow Elastomers), pigmented with 1.5% of a yellow polyolefin-based color concentrate, at a melt temperature of approximately 273° C. to a strand die 40 having 5 orifices spaced 25 mm apart across the die tip. Each orifice was 2.0 mm in diameter. The strands of molten polymer were extruded vertically downward onto the exterior surface 32 of an oil-heated steel transfer roll 30 having a diameter of 23 cm. The exterior surface of the transfer roll was machined using a computer controlled milling machine to have truncated hemispherical depressions 2.3 mm in diameter and 1.3 mm in depth, having a volume of 2.2 $mm^3$ and an area of 3.2 $mm^2$ arranged in a staggered array with center-to-center spacing between depressions of 5.1 mm resulting in 3.9 depressions/$cm^2$ across the exterior surface of the transfer roll.

After the depressions were filled or partially filled with the molten polymer, any excess molten polymer was removed from the exterior surface of the transfer roll by a brass doctor blade 42 having a thickness of 1.5 mm, acting against and normal to the exterior surface of the transfer roll at a pressure of 131 N/lineal cm. The excess molten polymer formed a small rolling bank of polymer contained in a trough formed by the doctor blade and two side walls pressed snugly against the transfer roll. The transfer roll was at approximately 176° C.

After the wiping action of the doctor blade, the transfer roll continued to rotate until the depressions and the molten polymer they contain were forced into contact with a non-woven substrate 10 (10 gram/$m^2$ CEREX PBN-II nylon spunbond, Cerex Advanced Fabrics) against a rubber backup roll 20 (121° C.) using a nip pressure of 105 N/lineal cm. Transfer of some of the molten polymer from the depressions to the nonwoven substrate occurred.

A portion of the molten polymer in the depressions remained in the depressions while the substrate pulled away from the transfer roll. As a result, the molten polymer tended to elongate or string between the depressions in the transfer roll and the substrate. A hot wire 44 was used to sever any strands of molten polymer formed as the substrate separated from the transfer roll. The basis weight of each transferred molten polymer region was 92.5 grams/$m^2$. The cumulative basis weight of the transferred polymer regions on the nonwoven substrate was 7.5 grams/$m^2$.

After transfer of the molten polymer to the substrate, the substrate was driven through a nip at a pressure of 35 N/lineal cm, formed by the rubber backup roll and a forming roll 50 (38° C.). The forming roll consisted of a silicone rubber sleeve on a steel roll. The rubber sleeve contained cavities formed by a laser beam as described in commonly assigned U.S. Pat. No. 5,792,411, with diameters of about 0.1 mm, depths of about 1.0 mm and spacing of about 1.0 mm (MD) and 0.5 mm (CD), resulting in about 194 cavities/$cm^2$. The cavities were angled at 45 degrees from the tangent of the roll surface in alternating directions with half of the cavities angled upstream in the machine direction, and half of the cavities angled downstream in the machine direction, each cavity in a given row, alternating in direction with the adjacent cavity in the same row. A portion of the transferred molten polymer in each of the discrete polymer regions 14 was forced into the cavities 52 on the forming. As a result, structures such as the stems depicted in FIG. 2 were formed in the discrete polymeric regions located on the substrate.

The height of the stems, measured normal to the surface of the base polymer region was 280 microns.

Example 2

To demonstrate the use of a transfer roll having larger sized depressions, a web was prepared as in Example 1 except the exterior surface of the transfer roll was machined using a computer controlled milling machine to have elongated hemispherical depressions 2.3 mm in diameter and 2.3 mm in depth, having a volume of 6.6 mm$^3$ and an area of 3.2 mm$^2$ arranged in a staggered array with center-to-center spacing between depressions of 5.1 mm resulting in 3.9 depressions/cm$^2$ across the exterior surface of the transfer roll. The basis weight of each transferred molten polymer region was 102 grams/m$^2$. The cumulative basis weight of the transferred polymer regions on the nonwoven substrate was 8.0 grams/m$^2$. The temperature of the backup roll was approximately 121° C. and the temperature of the forming roll was approximately 38° C. The height of the stems produced by the forming roll, measured normal to the surface of the base polymer region, was 280 microns.

Example 3

To demonstrate the use of a transfer roll having larger sized depressions, a web was prepared as in Example 1 except the exterior surface of the transfer roll was machined using a computer controlled milling machine to have elongated hemispherical depressions 2.5 mm in diameter and 2.5 mm in depth, having a volume of 12.9 mm$^3$ and an area of 5.1 mm$^2$ arranged in a staggered array with center-to-center spacing between depressions of 5.1 mm resulting in 3.9 depressions/cm$^2$ across the exterior surface of the transfer roll. The basis weight of each transferred molten polymer region was 221 grams/m$^2$. The cumulative basis weight of the transferred polymer regions on the nonwoven substrate was 28 grams/m$^2$. The temperature of the backup roll was approximately 121° C. and the temperature of the forming roll was approximately 38° C. The height of the stems produced by the forming roll, measured normal to the surface of the base polymer region, was 381 microns.

Example 4

To demonstrate the use of a different polymer, a web was prepared as in Example 1 except a linear low density polyethylene (ASPUN 6806, 100 MI, Dow Chemical) pigmented with 1.5% of a red polyolefin-based color concentrate (1053237, Clariant Corp.), was used at a melt temperature of approximately 190° C. The basis weight of each transferred molten polymer region was 86 grams/m$^2$. The cumulative basis weight of the transferred polymer regions on the nonwoven substrate was 6.7 grams/m$^2$. The temperature of the backup roll was approximately 121° C. and the temperature of the forming roll was approximately 38° C. The height of the stems produced by the forming roll, measured normal to the surface of the base polymer region, was 230 microns.

Example 5

To demonstrate the use of a transfer roll having larger sized depressions, a web was prepared as in Example 4 using the transfer roll described in Example 2. The basis weight of each transferred molten polymer region was 200 grams/m$^2$. The cumulative basis weight of the transferred polymer regions on the nonwoven substrate was 17 grams/m$^2$. The temperature of the backup roll was approximately 121° C. and the temperature of the forming roll was approximately 38° C. The height of the stems produced by the forming roll, measured normal to the surface of the base polymer region, was 267 microns.

Example 6

To demonstrate the use of a transfer roll having larger sized depressions, a web was prepared as in Example 4 using the transfer roll described in Example 3. The basis weight of each transferred molten polymer region was 298 grams/m$^2$. The cumulative basis weight of the transferred polymer regions on the nonwoven substrate was 37 grams/m$^2$. The temperature of the backup roll was approximately 121° C. and the temperature of the forming roll was approximately 38° C. The height of the stems produced by the forming roll, measured normal to the surface of the base polymer region, was 330 microns.

Example 7

To demonstrate the use of a different polymer, a web was prepared as in Example 1 except a polyurethane (PS 164–400, Huntsman Chemical) pigmented with 1.5% of a green polyolefin-based color concentrate (1030629, Clariant Corp.), was used at a melt temperature of approximately 207° C. A nip pressure of 70 N/lineal cm was used to transfer some of the molten polymer from the depressions to the nonwoven substrate. The basis weight of each transferred molten polymer region was 86 grams/m$^2$. The cumulative basis weight of the transferred polymer regions on the nonwoven substrate was 6.7 grams/m$^2$. After transfer of the molten polymer to the substrate, the substrate was driven through a nip at a pressure of 44 N/lineal cm, formed by a rubber backup roll and a forming roll. The temperature of the backup roll was approximately 93° C. and the temperature of the forming roll was approximately 38° C. The height of the stems produced by the forming roll, measured normal to the surface of the base polymer region, was 229 microns.

Example 8

To demonstrate the use of a transfer roll having larger sized depressions, a web was prepared as in Example 7 using the transfer roll described in Example 2. The basis weight of each transferred molten polymer region was 200 grams/m$^2$. The cumulative basis weight of the transferred polymer regions on the nonwoven substrate was 17 grams/m$^2$. The temperature of the backup roll was approximately 93° C. and the temperature of the forming roll was approximately 38° C. The height of the stems produced by the forming roll, measured normal to the surface of the base polymer region, was 254 microns.

Example 9

To demonstrate the use of a transfer roll having larger sized depressions, a web was prepared as in Example 7 using the transfer roll described in Example 3. The basis weight of each transferred molten polymer region was 292 grams/m$^2$. The cumulative basis weight of the transferred polymer regions on the nonwoven substrate was 37 grams/m$^2$. The temperature of the backup roll was approximately 93° C. and the temperature of the forming roll was approximately 38°

C. The height of the stems produced by the forming roll, measured normal to the surface of the base polymer region, was 330 microns.

Example 10

To demonstrate the use of a transfer roll having larger sized depressions, a web was prepared as in Example 1 except the exterior surface of the transfer roll was machined using a computer controlled milling machine to have elongated hemispherical depressions 5.1 mm in diameter and 5.1 mm in depth, having a volume of 34.3 mm$^3$ and an area of 6.5 mm$^2$ arranged in a staggered array with center-to-center spacing between depressions of 8.5 mm resulting in 1.4 depressions/cm$^2$ across the exterior surface of the transfer roll. A linear low density polyethylene (ASPUN 6806, 100 MI, Dow Chemical) pigmented with 2% of a red polyolefin-based color concentrate (1053237, Clariant Corp.), was used at a melt temperature of approximately 190° C. The temperature of the transfer roll was approximately 198° C. A polyester spunlaced nonwoven (SONTARA 8005, 68 grams/m$^2$, Dupont) was used for a substrate. A nip pressure of 131 N/lineal cm was used to transfer some of the molten polymer from the depressions to the nonwoven substrate. After transfer of the molten polymer to the substrate, the substrate was driven through a nip at a pressure of 175 N/lineal cm, formed by a rubber backup roll and a forming roll. The forming roll consisted of a silicone rubber sleeve on a steel roll containing cavities with diameters of about 0.13 mm, depths of about 1.2 mm and spacing of about 0.83 mm, resulting in about 248 cavities/cm$^2$. The cavities were 90 degrees from the tangent of the roll surface. The basis weight of each transferred molten polymer region was 945 grams/m$^2$. The cumulative basis weight of the transferred polymer regions on the nonwoven substrate was 85 grams/m$^2$. The temperature of the backup roll was approximately 93° C. and the temperature of the forming roll was approximately 49° C. The height of the stems produced by the forming roll, measured normal to the surface of the base polymer region, was 457 microns.

Example 11

To demonstrate the use of a different polymer and forming, a web was prepared as in Example 10 except a blend of KRATON 1117D SIS block copolymer (90%, Shell Chemical) with ASPUN 6806 polyethylene (10%, Dow Chemical) was used at a melt temperature of approximately 207° C. The temperature of the transfer roll was approximately 207° C. A nip pressure of 131 N/lineal cm was used to transfer some of the molten polymer from the depressions to the nonwoven substrate. After transfer of the molten polymer to the substrate, the substrate was driven through a nip at a pressure of 263 N/lineal cm, formed by a rubber backup roll and a forming roll. The forming roll consisted of a silicone rubber sleeve on a steel roll containing cavities with diameters of about 0.1 mm, depths of about 1.0 mm and spacing of about 0.5 mm, resulting in about 388 cavities/cm$^2$. The cavities were 90 degrees from the tangent of the roll surface. The basis weight of each transferred molten polymer region was 1302 grams/m$^2$. The cumulative basis weight of the transferred polymer regions on the nonwoven substrate was 117 grams/m$^2$. The temperature of the backup roll was approximately 93° C. and the temperature of the forming roll was approximately 49° C. The height of the stems produced by the forming roll, measured normal to the surface of the base polymer region, was 305 microns.

Example 12

To demonstrate the use of a different polymer and forming roll, a web was prepared as in Example 10 except ASPUN 6806 polyethylene was used at a melt temperature of approximately 190° C. The temperature of the transfer roll was approximately 190° C. A nip pressure of 175 N/lineal cm was used to transfer some of the molten polymer from the depressions to the nonwoven substrate. After transfer of the molten polymer to the substrate, the substrate was driven through a nip at a pressure of 263 N/lineal cm, formed by a rubber backup roll and a forming roll. The forming roll described in Example 1 was used. The basis weight of each transferred molten polymer region was 1240 grams/m$^2$. The cumulative basis weight of the transferred polymer regions on the nonwoven substrate was 112 grams/m$^2$. The temperature of the backup roll was approximately 104° C. and the temperature of the forming roll was approximately 66° C. The height of the stems produced by the forming roll, measured normal to the surface of the base polymer region, was 533 microns.

Example 13

To demonstrate the use of a different polymer and forming roll, a web was prepared as in Example 10 except PS 164-400 polyurethane was used at a melt temperature of approximately 201° C. The temperature of the transfer roll was approximately 218° C. A nip pressure of 131 N/lineal cm was used to transfer some of the molten polymer from the depressions to the nonwoven substrate. After transfer of the molten polymer to the substrate, the substrate was driven through a nip at a pressure of 44 N/lineal cm, formed by a rubber backup roll and a forming roll. A forming roll similar to that described in Example 1 was used except the cavities were angled at 45 degrees from the tangent of the roll surface in alternating directions with half of the cavities angled to the left in the cross direction, and half of the cavities angled to the right in the cross direction, each of the cavities in a given row, angled in the same direction, with the cavities in the adjacent row angled in the opposite direction. The basis weight of each transferred molten polymer region was 1147 grams/m$^2$. The cumulative basis weight of the transferred polymer regions on the nonwoven substrate was 103 grams/m$^2$. The temperature of the backup roll was approximately 93° C. and the temperature of the forming roll was approximately 49° C. The height of the stems produced by the forming roll, measured normal to the surface of the base polymer region, was 343 microns.

Example 14

To demonstrate the use of a different polymer a web was prepared as in Example 13 except ESTANE 58238 (Noveon) polyurethane was used at a melt temperature of approximately 190° C. The temperature of the transfer roll was approximately 218° C. A nip pressure of 219 N/lineal cm was used to transfer some of the molten polymer from the depressions to the nonwoven substrate. The basis weight of each transferred molten polymer region was 1286 grams/m$^2$. The cumulative basis weight of the transferred polymer regions on the nonwoven substrate was 116 grams/m$^2$. The temperature of the backup roll was approximately 93° C. and the temperature of the forming roll was approximately 49° C. The height of the stems produced by the forming roll, measured normal to the surface of the base polymer region, was 259 microns.

Example 15

To demonstrate the use of a different polymer and forming roll, a web was prepared as in Example 12 except a nip pressure of 219 N/lineal cm was used to transfer some of the molten polymer from the depressions to the nonwoven substrate. After transfer of the molten polymer to the substrate, the substrate was driven through a nip at a pressure of 44 N/lineal cm, formed by a rubber backup roll and a forming roll. The forming roll described in Example 11 was used. The basis weight of each transferred molten polymer region was 1069 grams/m$^2$. The cumulative basis weight of the transferred polymer regions on the nonwoven substrate was 96 grams/m$^2$. The temperature of the backup roll was approximately 93° C. and the temperature of the forming roll was approximately 49° C. The height of the stems produced by the forming roll, measured normal to the surface of the base polymer region, was 272 microns.

Example 16

To demonstrate the use of a different polymer, a web was prepared as in Example 15 except ENGAGE 8402 polyethylene was used at melt temperature of approximately 190° C. The temperature of the transfer roll was approximately 218° C. A nip pressure of 131 N/lineal cm was used to transfer some of the molten polymer from the depressions to the nonwoven substrate. After transfer of the molten polymer to the substrate, the substrate was driven through a nip at a pressure of 44 N/lineal cm, formed by a rubber backup roll and a forming roll. The forming roll described in Example 11 was used. The basis weight of each transferred molten polymer region was 821 grams/m$^2$. The cumulative basis weight of the transferred polymer regions on the nonwoven substrate was 74 grams/m$^2$. The temperature of the backup roll was approximately 93° C. and the temperature of the forming roll was approximately 49° C. The height of the stems produced by the forming roll, measured normal to the surface of the base polymer region, was 269 microns.

Example 17

To demonstrate the use of a different transfer roll, a web was prepared as in Example 16 except the exterior surface of the transfer roll was machined using a computer controlled milling machine to have hemispherical depressions 2.3 mm in diameter and 1.3 mm in depth, having a volume of 3.6 mm$^3$ and an area of 4.1 mm$^2$ arranged in a staggered array with center-to-center spacing between depressions of 5.1 mm resulting in 3.9 depressions/cm$^2$ across the exterior surface of the transfer roll. The temperature of the transfer roll was approximately 218° C. The doctor blade pressure was 219 N/lineal cm. A nip pressure of 131 N/lineal cm was used to transfer some of the molten polymer from the depressions to the nonwoven substrate. After transfer of the molten polymer to the substrate, the substrate was driven through a nip at a pressure of 88 N/lineal cm, formed by a rubber backup roll and a forming roll. The forming roll described in Example 11 was used. The basis weight of each transferred molten polymer region was 207 grams/m$^2$. The cumulative basis weight of the transferred polymer regions on the nonwoven substrate was 33 grams/m$^2$. The temperature of the backup roll was approximately 85° C. and the temperature of the forming roll was approximately 33° C. The height of the stems produced by the forming roll, measured normal to the surface of the base polymer region, was 432 microns.

Example 18

To demonstrate the use of a different polymer, and an additional processing step, a web was prepared as in Example 17 except ASPUN 6806 polyethylene was used at melt temperature of approximately 218° C. The temperature of the transfer roll was approximately 218° C. The doctor blade pressure was 219 N/lineal cm. A nip pressure of 131 N/lineal cm was used to transfer some of the molten polymer from the depressions to the nonwoven substrate. A polyester spunlaced nonwoven (140–070, 34 grams/m$^2$, BBA-Veratec) was used as a substrate. The forming roll described in Example 11 was used. The basis weight of each transferred molten polymer region was 154 grams/m$^2$. The cumulative basis weight of the transferred polymer regions on the nonwoven substrate was 24 grams/m$^2$. The temperature of the backup roll was approximately 85° C. and the temperature of the forming roll was approximately 58° C. The height of the stems produced by the forming roll, measured normal to the surface of the base polymer region, was 495 microns. The distal ends of the stems on the web were then subsequently capped using a similar method as taught in commonly assigned U.S. Pat. No. 6,132,660 (Kampfer). The web was fed through a nip formed by two calendar rolls. The temperature of the top roll which contacted the ends of the stems to form "caps" was approximately 103° C. The temperature of the bottom roll was approximately 60° C. The gap between the two rolls was set at 584 microns. The "capped" web was then fed into a heated rubber nip consisting of a heated top roll (73° C.) and a tap water-fed bottom roll, at a pressure of 750 N, to further deform the caps.

Example 19

To demonstrate the use of a different polymer, a web was prepared as in Example 17 except ESTANE 58238 polyurethane was used at a melt temperature of approximately 201° C. After transfer of the molten polymer to the substrate, the substrate was driven through a nip at a pressure of 44 N/lineal cm, formed by a rubber backup roll and a forming roll. The forming roll described in Example 11 was used. The basis weight of each transferred molten polymer region was 292 grams/m$^2$. The cumulative basis weight of the transferred polymer regions on the nonwoven substrate was 47 grams/m$^2$. The temperature of the backup roll was approximately 85° C. and the temperature of the forming roll was approximately 41° C. The height of the stems produced by the forming roll, measured normal to the surface of the base polymer region, was 269 microns.

Example 20

A web was produced as in Example 17 except two different polymers were used and delivered to three separate regions on the transfer roll. The trough described in Example 1 was constructed with two dividers between the side walls so as to have three separate smaller troughs arranged in an A-B-A configuration across the transfer roll, that could receive three separate molten polymer streams. KRATON 1657 was delivered to the 'A' troughs using the extruder described in Example 1 at a melt temperature of approximately 218° C. Polyethylene (ASPUN 6806, Dow Chemical) was delivered by a J&M Grid Melter and heated pipe to the 'B' trough at a melt temperature of approximately 218° C. The transfer roll described in Example 17 was used at a temperature of approximately 232° C. A nip pressure of 263

N/lineal cm was used to transfer some of the molten polymer from the depressions to the nonwoven substrate. After transfer of the molten polymer to the substrate, the substrate was driven through a nip at a pressure of 53 N/lineal cm, formed by a rubber backup roll and a forming roll. The forming roll described in Example 11 was used. The basis weight of each transferred molten polymer 'A' region was 171 grams/m². The cumulative basis weight of the transferred polymer 'A' regions on the nonwoven substrate was 26 grams/m². The basis weight of each transferred molten polymer 'B' region was 219 grams/m². The cumulative basis weight of the transferred polymer 'B' regions on the nonwoven substrate was 35 grams/m². The height of the stems produced by the forming roll in the 'A' region, measured normal to the surface of the base polymer region, was 170 microns. The temperature of the backup roll was approximately 85° C. and the temperature of the forming roll was approximately 43° C. The height of the stems produced by the forming roll in the 'B' region, measured normal to the surface of the base polymer region, was 508 microns.

Example 21

To demonstrate the use of a different polymer, and an additional processing step, a web was prepared as in Example 18 except H2104 polyethylene (Huntsman Chemical) was used at melt temperature of approximately 212° C. The transfer roll described in Example 10 was used. The temperature of the transfer roll was approximately 204° C. The doctor blade pressure was 131 N/lineal cm. A nip pressure of 175 N/lineal cm was used to transfer some of the molten polymer from the depressions to the nonwoven substrate. A polyester spunlaced nonwoven (SONTARA 8005, 68 grams/m², Dupont) was used as a substrate. After transfer of the molten polymer to the substrate, the substrate was driven through a nip at a pressure of 53 N/lineal cm, formed by a rubber backup roll and a forming roll. The forming roll described in Example 11 was used. The basis weight of each transferred molten polymer region was 1023 grams/m². The cumulative basis weight of the transferred polymer regions on the nonwoven substrate was 92 grams/m². The temperature of the backup roll was approximately 77° C. and the temperature of the forming roll was approximately 71° C. The height of the stems produced by the forming roll, measured normal to the surface of the base polymer region, was 394 microns. The distal ends of the stems on the web were then subsequently capped using the same equipment and conditions as described in Example 18.

Example 22

To demonstrate the use of a different transfer roll, a web was prepared as in Example 15 except the exterior surface of the transfer roll was machined using a computer controlled milling machine to have depressions in the shape of grooves parallel to the roll axis 20 cm long, 2.3 mm in width, 1.3 mm in depth, having a volume of about 600 mm³ and an area of 581 mm² arranged with a center-to-center spacing between grooves of 1.0 cm. The temperature of the transfer roll was approximately 176° C. ASPUN 6806 polyethylene was used at a melt temperature of approximately 176° C. The doctor blade pressure was 88 N/lineal cm. A nip pressure of 350 N/lineal cm was used to transfer some of the molten polymer from the depressions to the nonwoven substrate. After transfer of the molten polymer to the substrate, the substrate was driven through a nip at a pressure of 44 N/lineal cm, formed by a rubber backup roll and a forming roll. The forming roll described in Example 11 was used. The basis weight of each transferred molten polymer region was 36 grams/m². The cumulative basis weight of the transferred polymer regions on the nonwoven substrate was 98 grams/m². The temperature of the backup roll was approximately 77° C. and the temperature of the forming roll was approximately 71° C. The height of the stems produced by the forming roll, measured normal to the surface of the base polymer region, was 414 microns.

Example 23

To demonstrate the use of a different polymer, a web was prepared as in Example 22 except polyethylenevinylacetate (ELVAX 150, Dupont) was used at melt temperature of approximately 176° C. A nip pressure of 88 N/lineal cm was used to transfer some of the molten polymer from the depressions to the nonwoven substrate. The basis weight of each transferred molten polymer region was 43 grams/m². The cumulative basis weight of the transferred polymer regions on the nonwoven substrate was 117 grams/m². The temperature of the backup roll was approximately 77° C. and the temperature of the forming roll was approximately 71° C. The height of the stems produced by the forming roll, measured normal to the surface of the base polymer region, was 350 microns.

Example 24

To demonstrate that the webs of the invention can be laminated to additional substrates, a web was prepared as in Example 18 above. The web was then laminated to an elastic composite web using a Bostik 9041 hot melt adhesive using the procedure described in Example 4 of PCT Publication WO 00/20200. The elastic composite web was a 280 denier GLOSPAN elastic filaments (2.75 filaments/cm, stretch ratio of 2.5:1) positioned on top of a polypropylene spunbond nonwoven (15 grams/m², PGI Nonwovens).

Comparative Example C1

To compare the process of the present invention with the well known process of rotary screen printing, a web was prepared using the following materials, equipment and conditions. A 2.5 cm diameter single screw extruder was used to deliver molten polyurethane (ESTANE 58238) at a melt temperature of approximately 218° C. to a slot die having a 0.5 mm gap. The curtain of molten polymer was extruded vertically downward onto the interior surface of a metal screen roll (201° C.) having a thickness of 0.4 mm and a diameter of 25 cm. The screen roll was formed to have circular apertures 2.3 mm in diameter, arranged in a staggered array with center-to-center spacing between apertures of 5.1 mm resulting in 3.9 depressions/cm². A doctor blade attached to the die tip contacted the interior surface of the screen roll at a pressure of 35 N/lineal cm. The doctor blade forced molten polymer through the apertures in the screen and wiped most of the excess molten polymer from the interior surface of the screen. After the wiping action of the doctor blade, the screen roll continued to rotate until the apertures and the molten polymer they contain were forced into contact with a polyester spunlaced nonwoven substrate (SONTARA 8005, 68 gram/m², Dupont) against a steel impression roll (36° C.) using a nip pressure of 18 N/lineal cm. Transfer of some of the molten polymer from the apertures to the nonwoven substrate occurred. A portion of the molten polymer in the apertures remained in the apertures while the substrate pulled away from the screen roll. As a result, the molten polymer tended to elongate or string between the apertures in the screen roll and the substrate. A hot wire was used to sever any strands of molten polymer formed as the substrate separated from the screen roll. The basis weight of each transferred molten polymer region was 171 grams/m$^2$. The cumulative basis weight of the transferred polymer regions on the nonwoven substrate was 27 grams/m$^2$. After transfer of the molten polymer to the substrate, the substrate was driven through a nip at a pressure of 438 N/lineal cm formed by a rubber backup roll and the forming roll described in Example 1. The temperature of the forming roll was approximately 41° C. The height of the stems produced by the forming roll, measured normal to the surface of the base polymer region, was 190 microns. The height of the stems produced by the rotary screen process was significantly lower than the heights of the stems produced by the process of the invention.

Comparative Example C2

To further compare the process of the present invention with the well known process of rotary screen printing, a web was prepared as in Comparative Example C1 using KRATON 1657 SEBS block copolymer (Shell Chemical) pigmented with a polyolefin-based black color concentrate (CCC-294, 1%, Polymer Color) at a melt temperature of approximately 218° C. The temperature of the screen roll was approximately 190° C. The basis weight of each transferred molten polymer region was 97 grams/m$^2$. The cumulative basis weight of the transferred polymer regions on the nonwoven substrate was 16 grams/m$^2$. After transfer of the molten polymer to the substrate, the substrate was driven through a nip at a pressure of 438 N/lineal cm formed by a rubber backup roll and the forming roll described in Example 11. The temperature of the forming roll was approximately 41° C. The amount of polymer transferred to the substrate was insufficient to allow for the formation of stems using the rotary screen process even at very high nip pressures.

Comparative Example C3

To further compare the process of the present invention with the well known process of rotary screen printing, a web was prepared as in Comparative Example C1 using ASPUN 6806 polyethylene at a melt temperature of approximately 207° C. A grid melter was used to deliver the molten polymer to the interior surface of the screen roll. The screen roll was formed to have circular apertures 1.8 mm in diameter, arranged in a staggered array with center-to-center spacing between apertures of 6.4 mm resulting in 2.5 depressions/cm$^2$. The temperature of the screen roll was approximately 190° C. The nonwoven substrate described in Example 1 was used. The basis weight of each transferred molten polymer region was 49 grams/m$^2$. The cumulative basis weight of the transferred polymer regions on the nonwoven substrate was 5 grams/m$^2$. After transfer of the molten polymer to the substrate, the substrate was driven through a nip at a pressure of 438 N/lineal cm formed by a rubber backup roll and the forming roll described in Example 11. The temperature of the forming roll was approximately 41° C. The amount of polymer transferred to the substrate was insufficient to allow for the formation of stems using the rotary screen process even at very high nip pressures.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated. Various modifications and alterations of this invention will become apparent to those skilled in the art without departing from the scope of this invention. It should be understood that this invention is not to be unduly limited to illustrative embodiments set forth herein.

The invention claimed is:

1. A method for producing a composite web, the method comprising:
   providing a transfer roll comprising an exterior surface that comprises one or more depressions formed therein;
   delivering a molten thermoplastic composition onto the exterior surface of the transfer roll;
   wiping the molten thermoplastic composition from the exterior surface of the transfer roll, wherein a portion of the molten thermoplastic composition enters the one or more depressions, and wherein the portion of the molten thermoplastic composition in the one or more depressions remains in the one or more depressions after wiping the molten thermoplastic composition from the exterior surface of the transfer roll, and substantially all of the one or more depressions are substantially filled with the molten thermoplastic composition after the wiping;
   forcing a portion of a first major surface of a substrate into the one or more depressions, wherein the first major surface comprises a porous surface comprising fibers, and wherein a portion of the molten thermoplastic composition in the one or more depressions infiltrates the porous surface, and still further wherein the molten thermoplastic composition encapsulates at least a portion of at least some of the fibers;
   separating the substrate from the transfer roll, wherein one or more discrete polymeric regions comprising the thermoplastic composition are located on the first major surface of the substrate after separating the substrate from the transfer roll;
   contacting the one or more discrete polymeric regions on the substrate with a forming tool under pressure, wherein a portion of the thermoplastic composition in at least one discrete polymeric region of the one or more discrete polymeric regions contacting the forming tool enters a plurality of cavities in the forming tool; and
   separating the substrate and the one or more discrete polymeric regions from the forming tool, wherein the at least one discrete polymeric region comprises a plurality of structures formed thereon after separating the one or more discrete polymeric regions from the forming tool, the plurality of structures corresponding to the plurality of cavities in the forming tool.

2. A method according to claim 1, wherein each depression of the one or more depressions defines a depression volume, and further wherein the one or more depressions comprises at least two depressions that define different depression volumes.

3. A method according to claim 1, wherein at least one discrete polymeric region of the one or more discrete polymeric regions comprises a shape extending continuously along a length of the substrate.

4. A method according to claim 1, wherein at least one discrete polymeric region of the one or more discrete polymeric regions comprises a shape extending continuously across a width of the substrate.

5. A method according to claim 1, wherein the one or more depressions comprise a plurality of depressions comprising depressions having at least two different shapes.

6. A method according to claim 1, wherein each depression of the one or more depressions comprise a depression volume of about 3 cubic millimeters or more.

7. A method according to claim 1, wherein the footprint of each depression of the one or more depressions comprises an area of about 4 square millimeters or more.

8. A method according to claim 1, wherein the plurality of structures formed in the at least one discrete polymeric region comprise stems.

9. A method according to claim 8, wherein the stems are oriented substantially perpendicular to the substrate.

10. A method according to claim 8, wherein the stems are oriented at an acute angle to the substrate.

11. A method according to claim 1, wherein the plurality of structures formed in the at least one discrete polymeric region comprise hooks.

12. A method according to claim 1, wherein the plurality of structures formed in the at least one discrete polymeric region comprise pyramids.

13. A method according to claim 1, further comprising deforming the plurality of structures on the at least one discrete polymeric regions after separating the substrate and the one or more discrete polymeric regions from the forming tool.

14. A method according to claim 13, wherein deforming the plurality of structures comprises capping the plurality of structures.

15. A method for producing a composite web, the method comprising:
providing a transfer roll comprising an exterior surface that comprises one or more depressions formed therein;
delivering a molten thermoplastic composition onto the exterior surface of the transfer roll;
wiping the molten thermoplastic composition from the exterior surface of the transfer roll, wherein a portion of the molten thermoplastic composition enters the one or more depressions, and further wherein the portion of the molten thermoplastic composition in the one or more depressions remains in the one or more depressions after wiping the molten thermoplastic composition from the exterior surface of the transfer roll;
transferring at least a portion of the molten thermoplastic composition in the one or more depressions to a first major surface of a substrate by contacting the first surface of the substrate to the exterior surface of the transfer roll and the molten thermoplastic composition in the one or more depressions, followed by separating the substrate from the transfer roll, wherein one or more discrete polymeric regions comprising the thermoplastic composition are located on the first major surface of the substrate after separating the substrate from the transfer roll, wherein the first major surface of the substrate comprises a porous surface, and wherein transferring further comprises forcing a portion of the first major surface of the substrate into the one or more depressions, wherein a portion of the thermoplastic composition infiltrates the porous surface within the one or more depressions;
contacting the one or more discrete polymeric regions on the substrate with a forming tool under pressure, wherein a portion of the thermoplastic composition in at least one discrete polymeric region of the one or more discrete polymeric regions contacting the forming tool enters a plurality of cavities in the forming tool; and
separating the substrate and the one or more discrete polymeric regions from the forming tool, wherein the at least one discrete polymeric region comprises a plurality of structures formed thereon after separating the one or more discrete polymeric regions from the forming tool, the plurality of structures corresponding to the plurality of cavities in the forming tool.

16. A method according to claim 15, wherein the porous surface of the substrate comprises fibers, and further wherein the transferring further comprises encapsulating at least a portion of at least some of the fibers in the molten thermoplastic composition.

17. A method according to claim 15, wherein the first major surface of the substrate comprises fibers, and further wherein the transferring further comprises encapsulating at least a portion of at least some of the fibers in the molten thermoplastic composition by forcing the first major surface of the substrate against the exterior surface of the transfer roll and the molten thermoplastic composition in the one or more depressions.

18. A method according to claim 15, wherein substantially all of the one or more depressions are substantially filled with the molten thermoplastic composition after the wiping and before the transferring.

19. A method according to claim 15, wherein each depression of the one or more depressions defines a depression volume, and further wherein the one or more depressions comprises at least two depressions that define different depression volumes.

20. A method according to claim 15, wherein at least one discrete polymeric region of the one or more discrete polymeric regions comprises a shape extending continuously along a length of the substrate.

21. A method according to claim 15, wherein at least one discrete polymeric region of the one or more discrete polymeric regions comprises a shape extending continuously across a width of the substrate.

22. A method according to claim 15, wherein the one or more depressions comprise a plurality of depressions comprising depressions having at least two different shapes.

23. A method according to claim 15, wherein each depression of the one or more depressions comprise a depression volume of about 3 cubic millimeters or more.

24. A method according to claim 15, wherein the footprint of each depression of the one or more depressions comprises an area of about 4 square millimeters or more.

25. A method according to claim 15, wherein the plurality of structures formed on the at least one discrete polymeric region comprise stems.

26. A method according to claim 25, wherein the stems are oriented substantially perpendicular to the substrate.

27. A method according to claim 25, wherein the stems are oriented at an acute angle to the substrate.

28. A method according to claim 15, wherein the plurality of structures formed on the at least one discrete polymeric region comprise hooks.

29. A method according to claim 15, wherein tbe plurality of structures formed on the at least one discrete polymeric region comprise pyramids.

30. A method according to claim 15, further comprising deforming the piurality of structures on the at least one discrete polymeric regions after separating the substrate and the one or more discretepolymeric regions from the forming tool.

31. A method according to claim 30, wherein deformaing the plurality of structures comprises capping the plurality of structures.

32. A method for producing a composite web, the method comprising:
providing a transfer roll comprising an exterior surface that comprises one or more depressions formed therein;
delivering a molten thermoplastic composition onto the exterior surface of the transfer roll;
wiping the molten thermoplastic composition from the exterior surface of the transfer roll, wherein a portion of the molten thermoplastic composition enters the one or more depressions, and further wherein the portion of the molten thermoplastic composition in the one or more depressions remains in the one or more depressions after wiping the molten thermoplastic composition from the exterior surface of the transfer roll;
transferring at least a portion of the molten thermoplastic composition in the one or more depressions to a porous first major surface of a substrate by contacting the porous first surface of the substrate to the exterior surface of the transfer roll and the molten thermoplastic composition in the one or more depressions, wherein a portion of the porous first major surface enters the one or more depressions and a portion of the thermoplastic composition in the one or more depressions infiltrates the porous surface;
separating the substrate from the transfer roll, wherein one or more discrete polymeric regions comprising the thermoplastic composition are located on the porous first major surface of the substrate after separating the substrate from the transfer roll;
contacting the one or more discrete polymeric regions on the substrate with a forming tool under pressure, wherein a portion of the thermoplastic composition in at least one discrete polymeric region of the one or more discrete polymeric regions contacting the forming tool enters a plurality of cavities in the forming tool; and
separating the substrate and the one or more discrete polymeric regions from the forming tool, wherein the at least one discrete polymeric region comprises a plurality of structures formed thereon after separating the one or more discrete polymeric regions from the forming tool, the plurality of structures corresponding to the plurality of cavities in the forming tool.

33. A method according to claim 32, wherein the porous first major surface of the substrate comprises fibers, and further wherein the transferring further comprises encapsulating at least a portion of at least some of the fibers in the molten thermoplastic composition.

34. A method according to claim 32, wherein substantially all of the one or more depressions are substantially filled with the molten thermoplastic composition after the wiping and before the transferring.

35. A method according to claim 32, wherein each depression of the one or more depressions defines a depression volume, and further wherein the one or more depressions comprises at least two depressions that define different depression volumes.

36. A method according to claim 32, wherein at least one discrete polymeric region of the one or more discrete polymeric regions comprises a shape extending continuously along a length of the substrate.

37. A method according to claim 32, wherein at least one discrete polymeric region of the one or more discrete polymeric regions comprises a shape extending continuously across a width of the substrate.

38. A method according to claim 32, wherein the one or more depressions comprise a pluraiity of depressions comprising depressions having at least two different shapes.

39. A method according to claim 32, wherein each depression of the one or more depressions comprise a depression volume of about 3 cubic millimeters or more.

40. A method according to claim 32, wherein the footprint of each depression of the one or more depressions comprises an area of about 4 square millimeters or more.

* * * * *

UNITED STATES PATENT AND TRADEMARK OFFICE
CERTIFICATE OF CORRECTION

PATENT NO. : 7,037,457 B2
APPLICATION NO. : 10/012894
DATED : May 2, 2006
INVENTOR(S) : Seidel, David L.

It is certified that error appears in the above-identified patent and that said Letters Patent is hereby corrected as shown below:

Column 1
Line 20 (approx.), delete "performed" and insert -- pre-formed --, therefor.

Column 7
Line 1, after "Pat." delete "No." and insert -- Nos. --, therefor.

Column 7
Line 2, before "3,276,994 delete "Nos." and insert -- No. --, therefor.

Column 32
Line 1, in Claim 15, delete "discretc" and insert -- discrete --, therefor.

Column 32
Line 60, in Claim 29, after "wherein" delete "tbe" and insert -- the --, therefor.

Column 32
Line 64, in Claim 30, delete "piurality" and insert -- plurality --, therefor.

Column 32
Line 66, in Claim 30, delete "discretepolymeric" and insert -- discrete polymeric --, therefor.

Column 33
Line 1, in Claim 31, delete "deformaing" and insert -- deforming --, therefor.

UNITED STATES PATENT AND TRADEMARK OFFICE
CERTIFICATE OF CORRECTION

PATENT NO. : 7,037,457 B2
APPLICATION NO. : 10/012894
DATED : May 2, 2006
INVENTOR(S) : Seidel, David L.

It is certified that error appears in the above-identified patent and that said Letters Patent is hereby corrected as shown below:

Columnn 34
Line 32, in Claim 38, delete "pluraiity" and insert -- plurality --, therefor.
therefor.

Signed and Sealed this

Eleventh Day of July, 2006

JON W. DUDAS
*Director of the United States Patent and Trademark Office*